US012493349B2

(12) United States Patent
Kiourti et al.

(10) Patent No.: US 12,493,349 B2
(45) Date of Patent: Dec. 9, 2025

(54) SYSTEMS, DEVICES AND METHODS USING WEARABLE SENSORS FOR TOUCH-BASED COLLABORATIVE DIGITAL GAMING

(71) Applicant: Ohio State Innovation Foundation, Columbus, OH (US)

(72) Inventors: Asimina Kiourti, Columbus, OH (US); Scott Swearingen, Columbus, OH (US); EunKyoung Swearingen, Columbus, OH (US); Cameron King, Columbus, OH (US); Ian Williamson, Columbus, OH (US); Susan Thrane, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/629,183

(22) Filed: Apr. 8, 2024

(65) Prior Publication Data
US 2024/0338076 A1 Oct. 10, 2024

Related U.S. Application Data

(60) Provisional application No. 63/494,885, filed on Apr. 7, 2023.

(51) Int. Cl.
*G06F 3/01* (2006.01)
*A63F 13/212* (2014.01)

(52) U.S. Cl.
CPC ............ *G06F 3/015* (2013.01); *A63F 13/212* (2014.09)

(58) Field of Classification Search
CPC ............................... G06F 3/015; A63F 13/212
USPC ........................................................ 345/156
See application file for complete search history.

(56) References Cited

U.S. PATENT DOCUMENTS

| | | | |
|---|---|---|---|
| 2019/0005844 A1 | 1/2019 | Dragicevic et al. | |
| 2021/0081048 A1* | 3/2021 | Sedal | G06F 3/016 |
| 2021/0352087 A1 | 11/2021 | Ryver | |
| 2022/0160265 A1* | 5/2022 | Sankhala | G16H 40/63 |
| 2022/0343665 A1 | 10/2022 | Shrestha et al. | |

OTHER PUBLICATIONS

Adiyan Mujibiya, Xiang Cao, Desney S. Tan, Dan Morris, Shwetak N. Patel, and Jun Rekimoto. 2013. The sound of touch: on-body touch and gesture sensing based on transdermal ultrasound propagation. In Proceedings of the 2013 ACM international conference on Interactive tabletops and surfaces (ITS '13). Association for Computing Machinery, New York, NY, USA, 189-198. DOI:https://doi.org/10.1145/2512349.2512821.

(Continued)

*Primary Examiner* — Calvin C Ma
(74) *Attorney, Agent, or Firm* — Meunier Carlin & Curfman LLC

(57) ABSTRACT

A system may include a first wearable sensor in operable communication with a microcontroller. A system may include a second wearable sensor, wherein the microcontroller is configured to. A system may include receive a sensor signal from the first wearable sensor. A system may determine, based on the sensor signal, whether a collaborative interaction event occurred between the first wearable sensor and the second wearable sensor.

17 Claims, 21 Drawing Sheets

(56) References Cited

OTHER PUBLICATIONS

Chris Harrison, Desney Tan, and Dan Morris. 2011. Skinput: appropriating the skin as an interactive canvas. Commun. ACM 54, 8 (Aug. 2011), 111-118. DOI:https://doi.org/10.1145/1978542.1978564.

Srinath Sridhar, Anders Markussen, Antti Oulasvirta, Christian Theobalt, and Sebastian Boring. 2017. WatchSense: On- and Above-Skin Input Sensing through a Wearable Depth Sensor. In Proceedings of the 2017 CHI Conference on Human Factors in Computing Systems (CHI '17). Association for Computing Machinery, New York, NY, USA, 3891-3902. DOI:https://doi.org/10.1145/3025453.3026005.

Chris Harrison, Hrvoje Benko, and Andrew D. Wilson. 2011. OmniTouch: wearable multitouch interaction everywhere. In Proceedings of the 24th annual ACM symposium on User interface software and technology (UIST '11). Association for Computing Machinery, New York, NY, USA, 441-450. DOI:https://doi.org/10.1145/2047196.2047255.

Robert Xiao, Teng Cao, Ning Guo, Jun Zhuo, Yang Zhang, and Chris Harrison. 2018. LumiWatch: On-Arm Projected Graphics and Touch Input. Proceedings of the 2018 CHI Conference on Human Factors in Computing Systems. Association for Computing Machinery, New York, NY, USA, Paper 95, 1-11. DOI:https://doi.org/10.1145/3173574.3173669.

Gierad Laput, Robert Xiao, Xiang 'Anthony' Chen, Scott E. Hudson, and Chris Harrison. 2014. Skin buttons: cheap, small, low-powered and clickable fixed-icon laser projectors. In Proceedings of the 27th annual ACM symposium on User interface software and technology (UIST '14). Association for Computing Machinery, New York, NY, USA, 389-394. DOI:https://doi.org/10.1145/2642918.2647356.

Masa Ogata and Michita Imai. 2015. SkinWatch: skin gesture interaction for smart watch. In Proceedings of the 6th Augmented Human International Conference (AH '15). Association for Computing Machinery, New York, NY, USA, 21-24. DOI:https://doi.org/10.1145/2735711.2735830.

Suzuki, Y., Sekimori, K., Shizuki, B., & Takahashi, S. (2019). Touch Sensing on the Forearm Using the Electrical Impedance Method. 2019 IEEE International Conference on Pervasive Computing and Communications Workshops (PerCom Workshops), 255-260.

W. J. Tomlinson, S. Banou, C. Yu, M. Stojanovic and K. R. Chowdhury, "Comprehensive Survey of Galvanic Coupling and Alternative Intra-Body Communication Technologies," in IEEE Communications Surveys & Tutorials, vol. 21, No. 2, pp. 1145-1164, Secondquarter 2019, doi: 10.1109/COMST.2018.2879643.

Hall, P. S., & Hao, Y. (Eds.). (2012). Antennas and propagation for body-centric wireless communications. ProQuest Ebook Central.

Liwei Chan, Rong-Hao Liang, Ming-Chang Tsai, Kai-Yin Cheng, Chao-Huai Su, Mike Y. Chen, Wen-Huang Cheng, and Bing-Yu Chen. 2013. FingerPad: private and subtle interaction using fingertips. In Proceedings of the 26th annual ACM symposium on User interface software and technology (UIST '13). Association for Computing Machinery, New York, NY, USA, 255-260. DOI:https://doi.org/10.1145/2501988.2502016.

Da-Yuan Huang, Liwei Chan, Shuo Yang, Fan Wang, Rong-Hao Liang, De-Nian Yang, Yi-Ping Hung, and Bing-Yu Chen. 2016. DigitSpace: Designing Thumb-to-Fingers Touch Interfaces for One-Handed and Eyes-Free Interactions. In Proceedings of the 2016 CHI Conference on Human Factors in Computing Systems (CHI '16). Association for Computing Machinery, New York, NY, USA, 1526-1537. DOI:https://doi.org/10.1145/2858036.2858483.

Junhan Zhou, Yang Zhang, Gierad Laput, and Chris Harrison. 2016. AuraSense: Enabling Expressive Around-Smartwatch Interactions with Electric Field Sensing. In Proceedings of the 29th Annual Symposium on User Interface Software and Technology (UIST '16). Association for Computing Machinery, New York, NY, USA, 81-86. DOI:https://doi.org/10.1145/2984511.2984568.

Yang Zhang, Junhan Zhou, Gierad Laput, and Chris Harrison. 2016. SkinTrack: Using the Body as an Electrical Waveguide for Continuous Finger Tracking on the Skin. In Proceedings of the 2016 CHI Conference on Human Factors in Computing Systems (CHI '16). Association for Computing Machinery, New York, NY, USA, 1491-1503. DOI:https://doi.org/10.1145/2858036.2858082.

N. Sekine, Y. Sato, M. Shinagawa, D. Saito and K. Oohashi, "Signal-propagation analysis for two person intra-body communication services," TENCON 2017—2017 IEEE Region 10 Conference, 2017, pp. 951-956, doi: 10.1109/TENCON.2017.8227995.

Li, M., Song, Y., Li, W., Wang, G., Bu, T., Zhao, Y., & Hao, Q. (2017). The Modeling and Simulation of the Galvanic Coupling Intra-Body Communication via Handshake Channel. Sensors (Basel, Switzerland), 17(4), 863. https://doi.org/10.3390/s17040863.

* cited by examiner

SYSTEMS, DEVICES AND METHODS USING WEARABLE SENSORS FOR TOUCH-BASED COLLABORATIVE DIGITAL GAMING

CROSS-REFERENCE TO RELATED APPLICATIONS

This application claims the benefit of U.S. provisional patent application No. 63/494,885, filed on Apr. 7, 2023, and titled "SYSTEMS, DEVICES AND METHODS USING WEARABLE SENSORS FOR TOUCH-BASED COLLABORATIVE DIGITAL GAMING," the disclosure of which is expressly incorporated herein by reference in its entirety.

BACKGROUND

Touch, including human contact between individuals, is an important part of both recreation and rehabilitation. Research on touch-based gaming platforms shows that video game platforms which physically connect players through skin-to-skin contact have large potential to improve well-being and relationships with others.

Computer systems can facilitate recreation and rehabilitation, including by tracking user activities, automating aspects of a game (e.g., scoring) and/or providing gameplay elements that enhance the experience of a game. For example, computer systems can provide visual indicators of the progress of the game, visualize gameplay elements, play sounds, etc.

Improving the detection of touch can improve both recreation and rehabilitation using computer systems.

SUMMARY

In some aspects, the techniques described herein relate to a wearable device including: one or more galvanic coupling sensors, each galvanic coupling sensor including a plurality of electrodes configured to interface with a wearer's skin; and a microcontroller operably coupled to the one or more galvanic coupling sensors, the microcontroller being configured to detect a collaborative interaction event by measuring power transferred between the one or more galvanic coupling sensors.

In some aspects, the techniques described herein relate to a wearable device, wherein at least one of the one or more galvanic coupling sensors is configured to transmit a high frequency signal through the wearer's skin.

In some aspects, the techniques described herein relate to a wearable device, further including a wristband, where the one or more galvanic coupling sensors are disposed on the wristband.

In some aspects, the techniques described herein relate to a wearable device, wherein the first wearable sensor includes a wristband, the wristband including a conductive yarn.

In some aspects, the techniques described herein relate to a wearable device, wherein the wristband includes a plurality of sections of conductive yarn and a plurality of sections of nonconductive yarn.

In some aspects, the techniques described herein relate to a wearable device, wherein each of the plurality of sections of conductive yarn are separated by sections of nonconductive yarn of the plurality of sections of nonconductive yarn.

In some aspects, the techniques described herein relate to a system including: a plurality of wearable devices, each wearable device including at least two galvanic coupling sensors, each galvanic coupling sensor including a plurality of electrodes configured to interface with a wearer's skin and a microcontroller operably coupled to the at least two galvanic coupling sensors, the microcontroller being configured to detect a collaborative interaction event by measuring power transferred between the at least two galvanic coupling sensors; and a remote computing device operably coupled to at least one of the wearable devices, the remote computing device being configured to receive a detection from at least one of the plurality of wearable devices that a collaborative interaction event has occurred.

In some aspects, the techniques described herein relate to a system, wherein at least one of the at least two galvanic coupling sensors is configured to transmit a high frequency signal through the wearer's skin.

In some aspects, the techniques described herein relate to a system, wherein the remote computing device is configured to execute a control command based on the detection from at least one of the plurality of wearable devices that a collaborative interaction event has occurred.

In some aspects, the techniques described herein relate to a system, wherein the control command is configured to facilitate interactive learning or provide therapy.

In some aspects, the techniques described herein relate to a system, wherein at least one of the plurality of wearable devices includes a wristband, the wristband including a conductive yarn.

In some aspects, the techniques described herein relate to a system, wherein the wristband includes a plurality of sections of conductive yarn and a plurality of sections of nonconductive yarn.

In some aspects, the techniques described herein relate to a system including: a first wearable sensor in operable communication with a microcontroller; and a second wearable sensor; wherein the microcontroller is configured to: receive a sensor signal from the first wearable sensor; determine, based on the sensor signal, whether a collaborative interaction event occurred between the first wearable sensor and the second wearable sensor.

In some aspects, the techniques described herein relate to a system, wherein the first wearable sensor includes a plurality of electrodes configured to sense electrical potentials on a wearer's skin.

In some aspects, the techniques described herein relate to a system, wherein the first wearable sensor includes a wristband, the wristband including a conductive yarn.

In some aspects, the techniques described herein relate to a system, wherein the wristband includes a plurality of sections of conductive yarn and a plurality of sections of nonconductive yarn.

In some aspects, the techniques described herein relate to a system, wherein each of the plurality of sections of conductive yarn are separated by sections of nonconductive yarn of the plurality of sections of nonconductive yarn.

In some aspects, the techniques described herein relate to a system, wherein the microcontroller is operably connected to a display, and configured to output an indication that the collaborative interaction event occurred to the display.

In some aspects, the techniques described herein relate to a system, wherein the collaborative interaction event includes a skin-to-skin touch between a first user wearing the first wearable sensor and a second user wearing the second wearable sensor. 21.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
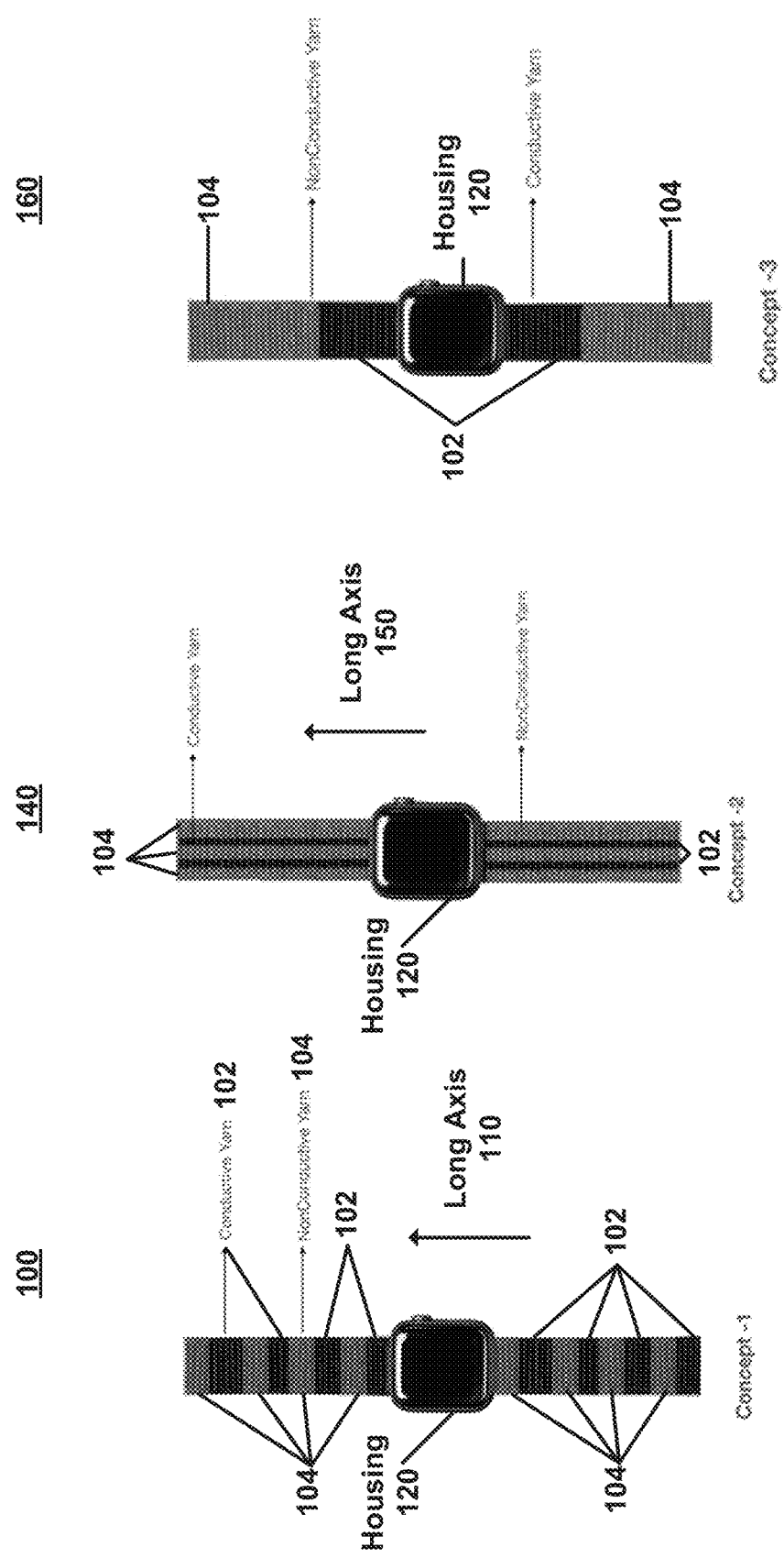
FIG. 1 illustrates example wearable sensors, according to implementations of the present disclosure.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for controlling a virtual environment (e.g. controlling a game), it will become evident to those skilled in the art that the implementations are not limited thereto, but are applicable to performing any kind of user input or control. Throughout the present disclosure, the term "collaborative interaction event" may be used to refer to contact between users (e.g., skin-to-skin), contact with sensors worn by users, patterns of contact between users and/or sensors, near contact between users (proximity sensing), near contact with sensors worn by users (proximity sensing), or patterns of near contact between users and/or sensors.

Implementations of the present disclosure include systems, devices, and methods for detecting human contact. Contact sensors like mechanical buttons, touch screens, and force-sensitive resistors do not detect direct contact between humans because the button, touch screen, or force sensitive resistor detects contact with itself—not with another human. Implementations of the present disclosure include wearable devices that can use galvanic coupling (current and voltage flows through a living body) to detect contact with that body. This can allow implementations of the present disclosure to detect contact between the skin of two individuals without any intervening sensors or devices. Direct skin-to-skin contact can be required for types of therapy and rehabilitation that use touch, and therefore implementations of the present disclosure can be used to improve rehabilitation, therapy, and/or games in general.

Described herein are systems for collaborative interaction using wearable technology. Human-body-communication ("HBC") systems described herein can use the human body as a channel for propagating electrical signals. A sensor with conductive electrodes (e.g. two electrodes) can be worn on the skin of both players to differentially send a signal. Optionally, the signals are in the kHz to low MHz range. When the two players touch, a propagation channel can form in the human tissue that allows signals to travel between the sensors with a predictable attenuation.

With reference to FIG. 1, example sensor configurations are shown for a wearable device including conductive yarn that can be used to detect physical touch. FIG. 1 illustrates three example implementations of the present disclosure. The wearable devices 100, 140, 160 use sections of conductive and non-conductive fabrics (e.g., yarns) to form electrodes that can contact the wearer's skin. As described throughout the present disclosure, electrodes can be used to implement galvanic coupling sensors by providing an electrical path for current to be transmitted into the body of a wearer, and/or by providing an electrical path for current from a transmitter to be received and detected (for example, when separate body parts with a transmitter and receiver contact each other). Additionally, as used herein, the term "galvanic coupling sensor" refers to a galvanic coupling transmitter, receiver, or transceiver, which can be part of a system for detecting galvanic coupling by transmitting an electrical signal through a subject.

By separating sections of conductive and non-conductive fabrics, the wearable devices 100, 140, 160 can include any number of electrodes in different positions and orientations relative to one another.

FIG. 1 illustrates non-limiting examples of ways that conductive and non conductive fabrics can be used to form electrodes in various implementations of the present disclosure.

As shown in FIG. 1, a first example implementation of the wearable device 100 includes a wristband with sections of alternating conductive yarn 102 and non-conductive yarn 104. In the first implementation of the wearable device 100 the sections of conductive and nonconductive yarns are perpendicular to the long axis 110 of the wristband.

Still with reference to FIG. 1, a second example implementation of the wearable device 140 includes alternating sections of conductive yarn 102 and non-conductive yarn 104, where the conductive and non-conductive yarns are arranged parallel to the long axis 150 of the wristband of the wearable device.

Again with reference to FIG. 1, a third example implementation of the wearable device 160 includes a section of conductive yarn 102 on each side of a housing 120 and two sections of non-conductive yarn 104 on either side of the sections of conductive yarn 102. It should be understood that the sections of conductive yarn and/or sections of nonconductive yarn can be operably connected to a controller (e.g., the computing device 200, shown in FIG. 2) and used to measure a collaborative touch event. As described in more detail with reference to FIGS. 3, 4, 6, 8A and 8B, the controller can optionally be part of the housing 120 shown in FIG. 1.

Figure 3:
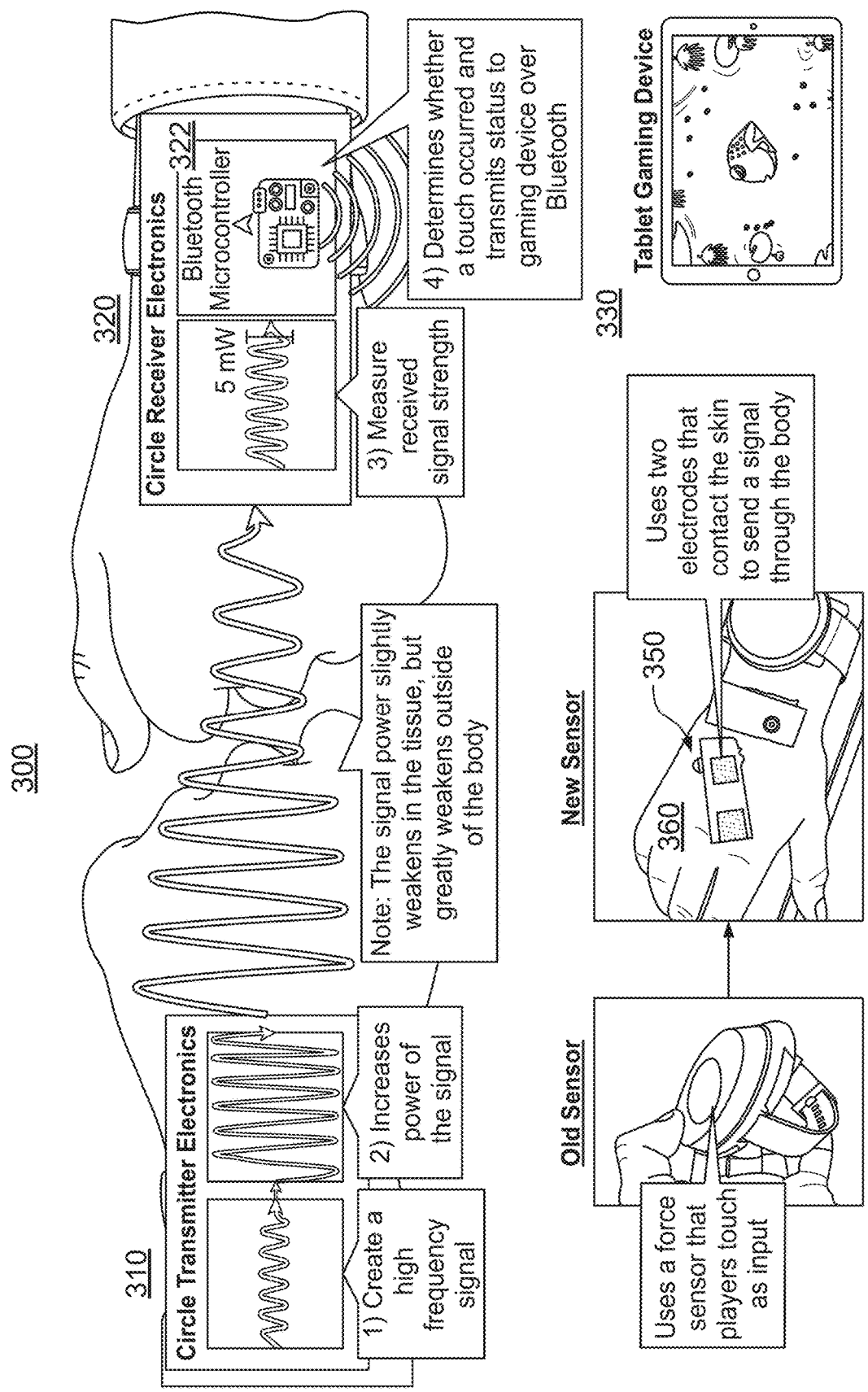
FIG. 3 illustrates an example system including wearable sensors, according to an example implementation of the present disclosure.

With reference to FIG. 3, a system 300 is shown according to implementations of the present disclosure. The system 300 includes a transmitter 310, a receiver 320, and a computing device 330. The transmitter 310 can include both a signal generator and an amplifier (not shown). Optionally, the signal generated by the signal generator is in the range from kilohertz to megahertz. As a non-limiting example, the signal can be a high frequency signal in the range from 3-30 MHz in some implementations of the present disclosure. The present disclosure further contemplates that the frequency of the signal can be varied over time, and/or that signals of different frequencies can be transmitted simultaneously. The transmitter 310 can be operably coupled to one or more electrodes (e.g., the adhesive patch 350 with electrodes) positioned on the skin (e.g., the hand 360). The signal from the transmitter 310 can energize the skin of the wearer using the electrodes.

The receiver 320 can be configured to measure the signal strength of a received signal (e.g., by measuring the power received, and/or the power received at a certain frequency). When a body part with a transmitter 310 contacts a body part with a receiver 320, the electrical signal from the transmitter 310 can flow through the body parts to the receiver 320. Based on the signal strength of the signal at the receiver 320, the receiver can detect whether the body part with the receiver 320 is contacting a body part with a transmitter 310.

Figure 2:
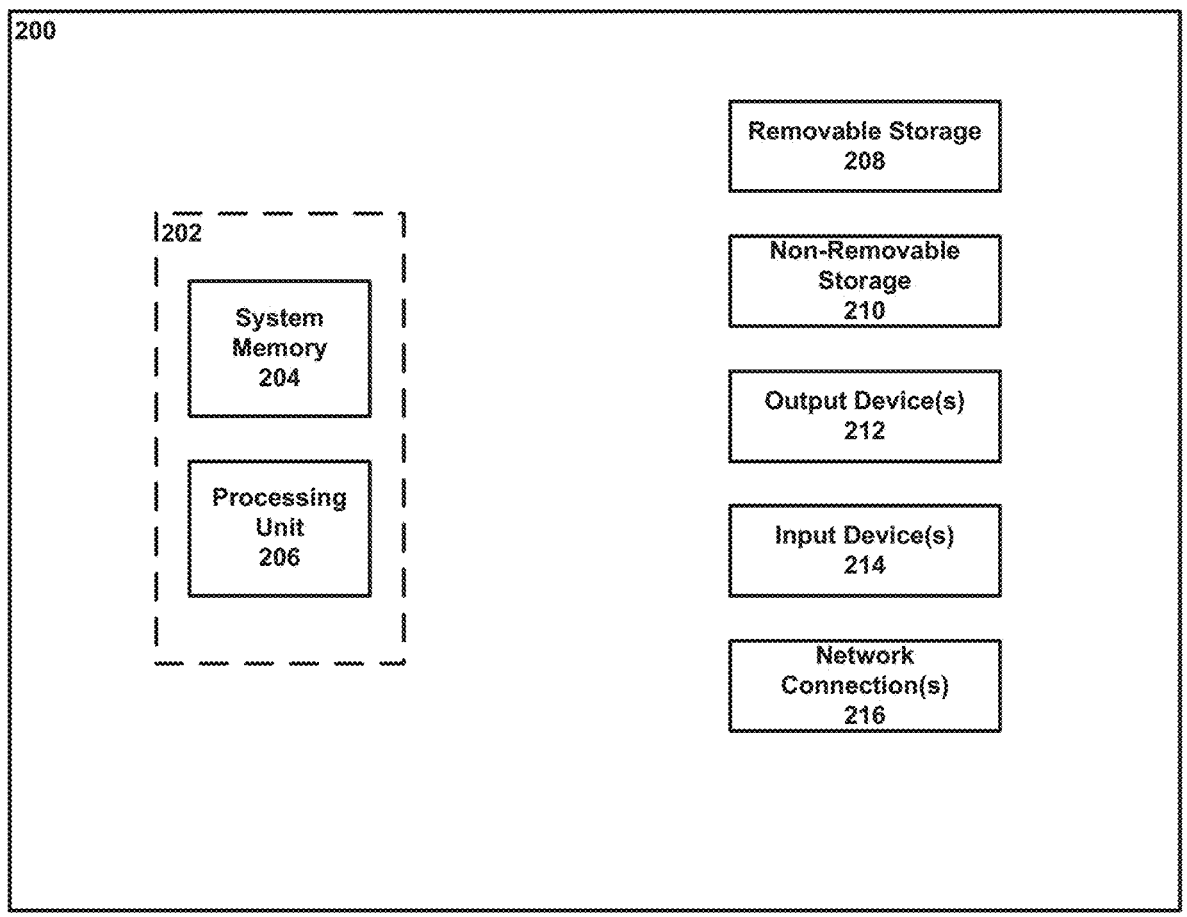
FIG. 2 illustrates an example computing device.

It should be understood that the transmitter 310 and/or receiver 320 can include a computing device (e.g., the computing device 200 illustrated in FIG. 2). Optionally, the computing device can be configured to control the transmitter 310 (e.g., by changing the power, frequency, and/or amplitude of the transmitter) and/or receiver 320 (e.g., by recording power, frequency, and/or amplitude of the received signal). Additionally, the computing device(s) included in the transmitter and/or receiver can optionally include network connections (e.g., the network connections 216 described with reference to FIG. 2). The example receiver 320 shown in FIG. 3 includes a Bluetooth microcontroller 322 as an example computing device. The Bluetooth microcontroller 322 can determine that touch has occurred based on the received signal (e.g. by comparing the amplitude and/or power of the signal to a threshold), and transmit a signal that the touch has occurred via a Bluetooth signal. It should be understood that Bluetooth is only a non-limiting example, and that implementations of the present disclosure can use any wired or wireless communications.

The computing device 330 can include any or all of the components of the example computing device 200 described with reference to FIG. 2. In FIG. 3, the computing device 330 is illustrated as a tablet, but it should be understood that the tablet is only intended as a non-limiting example and that other computing devices, including mobile computing devices can be used. The computing device 330 can be in communication with the transmitter 310 and/or receiver 320, and/or configured to control the transmitter 310 and/or receiver 320. For example, the computing device 330 can be configured to control when the transmitter 310 transmits signals, and/or receive detections from the receiver 320 that the signal has been received.

It should be understood that the transmitter 310 and/or receiver 320 can be optionally implemented as transceivers that can both transmit and receive signals.

Still with reference to FIG. 3, the transmitter 310 and/or receiver 320 can include electrodes positioned on the skin of a user (e.g., a pair of electrodes). An example adhesive patch 350 is placed on a hand 360, where the adhesive patch 350 includes two electrodes. While FIG. 3 illustrates an adhesive patch 350 with electrodes, it should be understood that electrodes according to implementations of the present disclosure can be formed in any wearable device, including as a wristband or as part of any other garment.

Implementations of the present disclosure include a skin-to-skin contact gaming platform that enables creators to make collaborative games that improve human connection.

The example implementation of a system shown in FIG. 3 can be implemented as a system including four sensors (each placed on the wrists of each of the two users or players). The example implementation achieves the desired sensitivity in discriminating between touch and no touch for collaborative gaming and therapy applications by using the power transferred between the sensors to determine the touching status of the players and share the result with a gaming device (e.g. the computing device 330) via Bluetooth.

Figure 6:
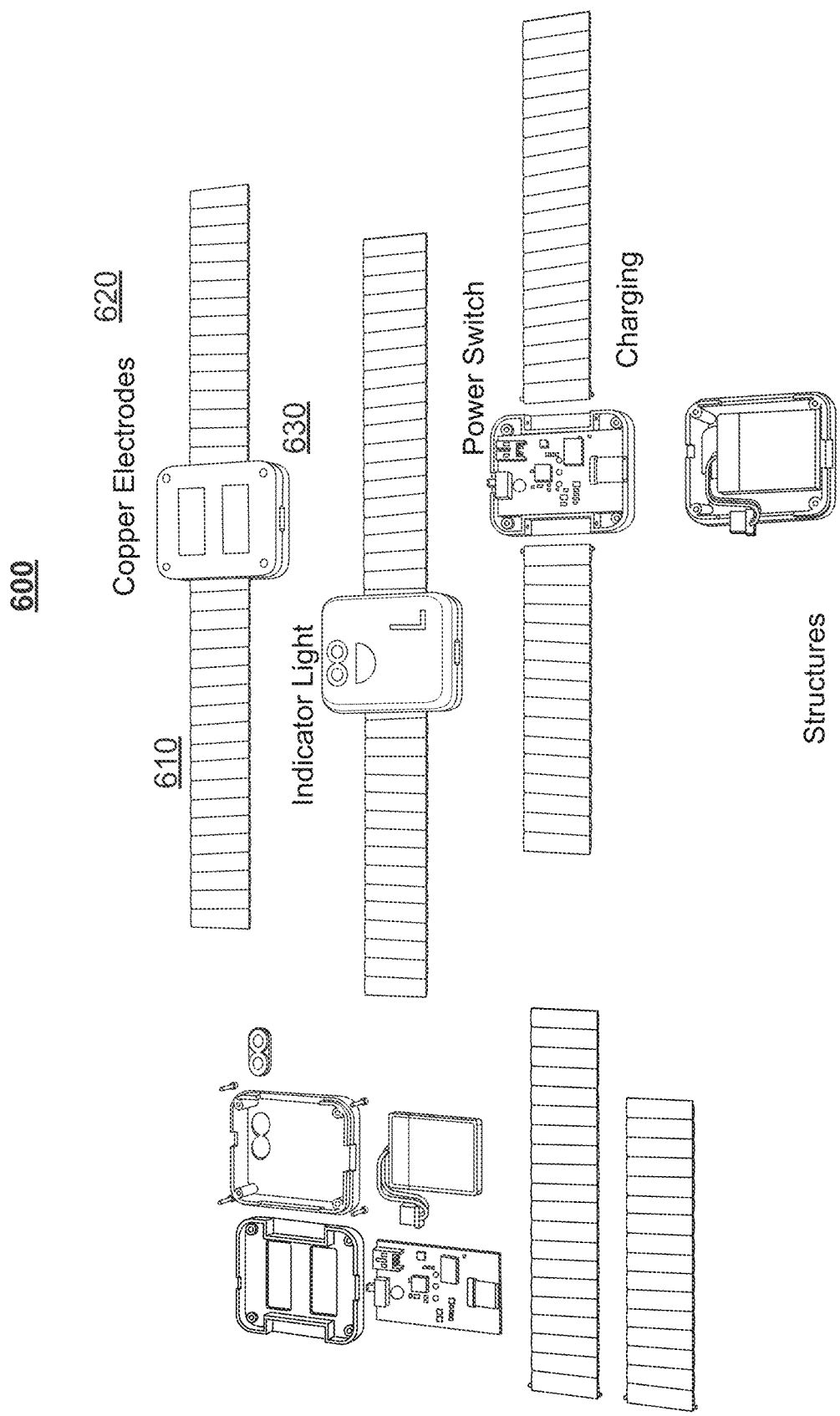
FIG. 6 illustrates an example of a wristband including copper electrodes, according to implementations of the present disclosure.
Figure 7B:
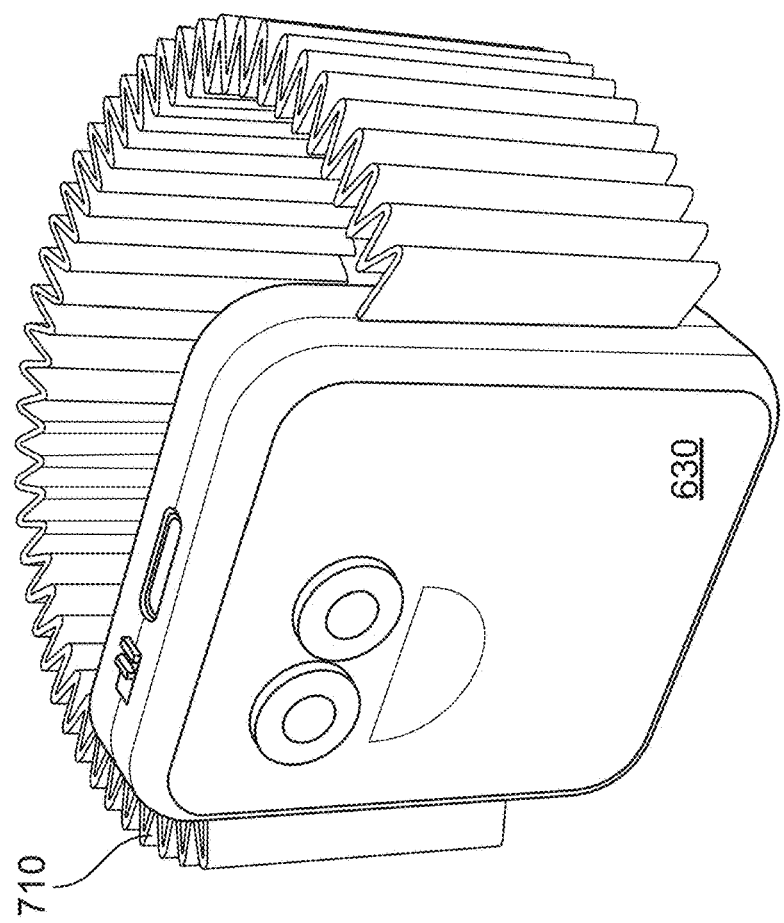
FIG. 7B illustrates a wristband and housing according to implementations of the present disclosure.
Figure 7A:
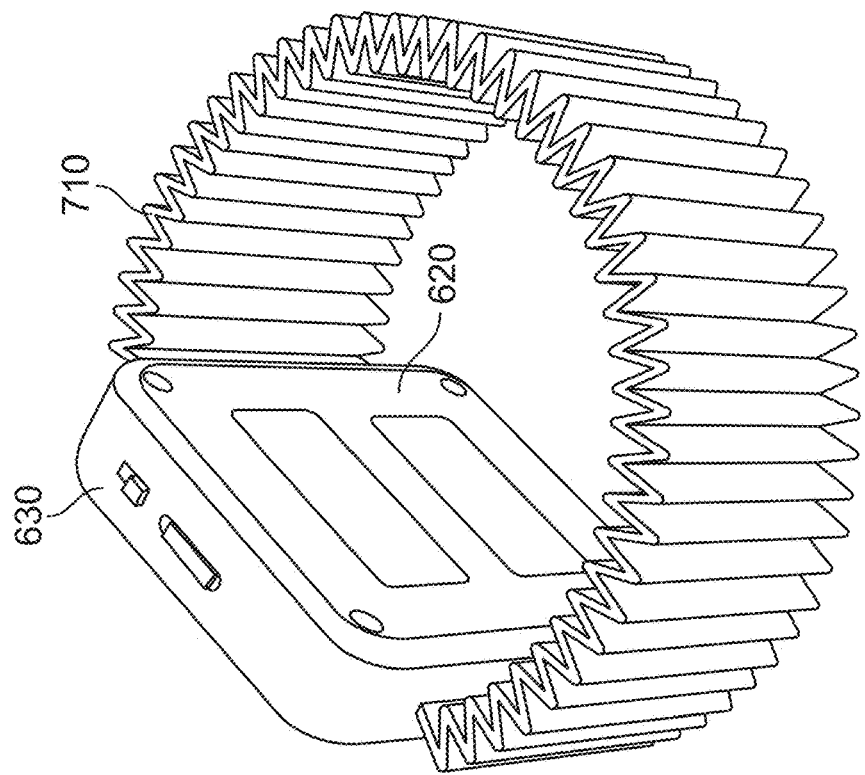
FIG. 7A illustrates a wristband and housing with electrical contacts, according to implementations of the present disclosure.

It should be understood that the 350 is intended only as a non-limiting example of a wearable device with electrodes that can be used to implement the transmitter, receiver, and/or transceivers described herein, and that implementations of the present disclosure can be implemented using the conductive yarn electrodes of the wearable devices 100, 140, 160 shown in FIG. 1, as well as the wearable devices shown and described in FIGS. 6, 7A, and 7B.

Figure 4:
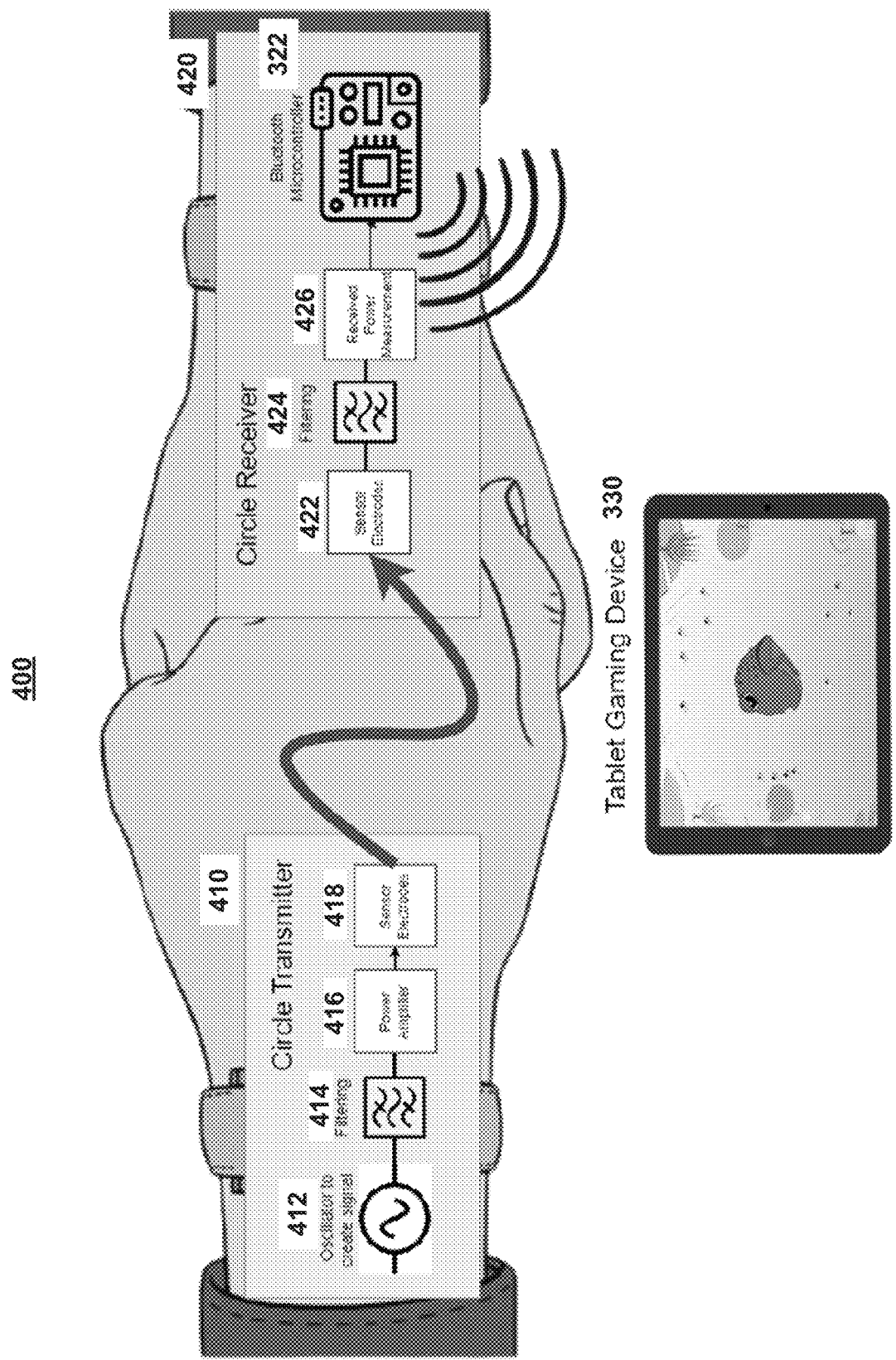
FIG. 4 illustrates an example system including a transmitter, a receiver, and a computing device, according to implementations of the present disclosure.

FIG. 4 illustrates a system 400 for detecting touch including a transmitter 410 and receiver 420 according to an example implementation of the present disclosure. The transmitter 410 includes an oscillator 412, filter(s) 414, a power amplifier 416, and sensor electrodes 418. The signal generated by the oscillator 412 is filtered by one or more filters 414, amplified by the power amplifier 416 and passed into the skin by the sensor electrodes 418.

The receiver 420 includes sensor electrodes 422, filter(s) 424, a measurement module 426, and a Bluetooth microcontroller 322. A signal detected by the sensor electrodes 422 is filtered by the filter(s) 424 and can be measured by the measurement module 426. The Bluetooth microcontroller 322 (described in detail with reference to FIG. 3) can transmit a measurement of the filtered signal. Alternatively or additionally, the Bluetooth microcontroller 322 can determine that contact has occurred based on the output of the measurement module 426 and optionally transmit a signal indicating that contact has or has not occurred. As described with reference to FIG. 3, the Bluetooth microcontroller 322 can be any computing device, and network connections other than Bluetooth are contemplated by implementations of the present disclosure.

Figure 5:
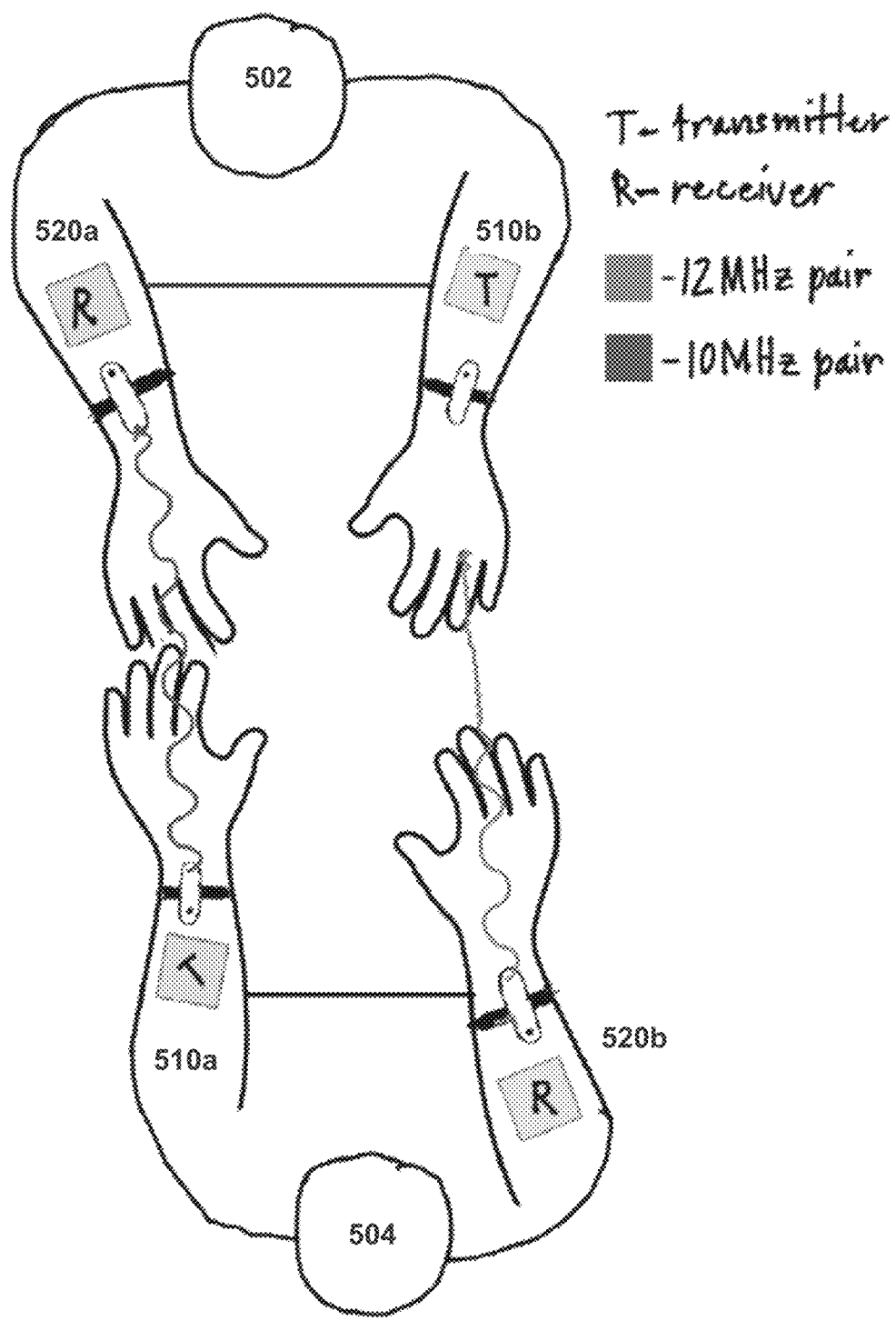
FIG. 5 illustrates an example system including four wearable devices and two users, according to implementations of the present disclosure.

Implementations of the present disclosure can include any number of transmitters and/or receivers. With reference to FIG. 5, an example system includes two transmitters 510a, 510b and two receivers 520a, 520b. The transmitter 510a and receiver 520a are configured to transmit and receive at 10 MHz, respectively. The transmitter 510b and receiver 520b are configured to transmit and receive at 12 MHz, respectively. 10 MHz and 12 MHz are intended only as non-limiting examples, as described with reference to FIG. 3, the present disclosure contemplates transmitting and/or receiving kilohertz to megahertz signals.

In the example shown in FIG. 5, a first user 502 and second user 504 can each wear one transmitter and one receiver. Therefore a touch by the first user 502 to the second user can be detected by using the transmitter 510b on the first user 502 to send a signal to the receiver 520b on the second user 504. Likewise, a touch by the second user 504 to the first user 502 can be detected by the receiver 520a on the first user 502 receiving a signal from the transmitter 510a on the second user 504. As shown in FIG. 5, the receivers and transmitters can be placed on opposite sides of each user's bodies, so that when the users 502, 504 face each other the transmitter 510a and receiver 520a are adjacent to each other and transmitter 510b and receiver 520b are adjacent to each other. As described with reference to FIG. 4, the present disclosure contemplates that the transmitters and/or receivers can include filters to limit the bandwidth of the signals transmitted/received. In the example shown in FIG. 5, the transmitter 510a transmits a 10 MHz signal, and the receiver 520b can be configured so that a 10 MHz signal is filtered out and not received by the receiver 520b. Likewise, the receiver 520a can be configured to filter 12 MHz signals so that the signal from transmitter 510b is not received by receiver 520a.

It should be understood that the placement of transmitters 510a, 510b, and receivers 520a, 520b is intended only as a non-limiting example, and that any number or configuration of transmitters 510a, 510b and receivers 520a, 520b is contemplated by the present disclosure. Additionally, it should be understood that the transmitters 510a, 510b, and/or receivers 520a, 520b can be implemented optionally as transceivers, as described throughout the present disclosure.

With reference to FIG. 6, the present disclosure contemplates that different types of wearable devices can be used for detecting touch using galvanic coupling. FIG. 6 illustrates a wearable device 600 including a wristband 610, copper electrodes 620 and a housing 630. The housing 630 can optionally include a transmitter, receiver, and/or transceiver operationally coupled to the copper electrodes 620 according to various implementations of the present disclosure. Transmitters, receivers, and transceivers are described in greater detail with reference to FIG. 3. The transmitter, receiver, and/or transceiver can be coupled to the copper electrodes 620 so that when the wristband 610 is worn, the copper electrodes 620 contact the wearer's skin, allowing for transmission and/or reception of signals.

With reference to FIGS. 7A and 7B, implementations of the present disclosure include flexible and/or elastic wristbands 710 that can couple the housing 630 to a wearer. FIG. 7A illustrates a wearable device positioned so that the copper electrodes 620 are visible. FIG. 7B illustrates an alternative perspective of the wearable device shown in FIG. 7A. As shown in FIGS. 7A and 7B, the wristband 710 can be formed from a corrugated length of elastic plastic (e.g., TPU) which can optionally be 3D printed.

Example

A study was performed of an example implementation of the present disclosure.

The example implementation showed the feasibility and user experience of skin-to-skin contact sensors as input for collaborative video games. The example implementation of the technology in the study used pairs of conductive material contacting the skin that create a propagation channel when humans achieve skin-to-skin contact. Existing research on touch-based gaming platforms [1] shows that video game platforms which physically connect players through skin-to-skin contact have large potential to improve well-being and relationships with others. The long-term vision is the creation of a skin-to-skin contact gaming platform that enables creators to make collaborative games that improve human connection.

Human body communication (HBC) systems include systems that can use galvanic coupling. As used herein, "galvanic coupling" refers to using the a body of a subject (e.g., a human wearing a wearable device) as a channel for propagating electrical signals. Galvanic coupling uses a sensor with two conductive electrodes that is worn on the skin of both players to differentially send a signal. When two players touch, a propagation channel forms in the human tissue that allows 100 kHz to 5 MHz signals to travel between the sensors with a predictable attenuation [9]. Simulation and experimental results from literature using rectangular electrodes [10] served as an unoptimized starting point for the skin-to-skin contact sensor design. The sensors in the study were then simulated using rectangular prisms that modeled the conductivity, permittivity, and density of human tissue in the arms and torso, validating the effectiveness of the example implementation.

The example implementation of the present disclosure includes several improvements to human body communication systems, devices and methods. Some example improvements include: 1) using HBC sensors to sense the presence or absence of touch, 2) the number and location of sensors (e.g., the transmitter receiver pairs illustrated in FIG. 5), and 3) the size and form factor of the wearable devices described herein (e.g., the devices shown in FIGS. 1, 6, 7A, and 7B) which are optimized for collaborative touch applications including therapy and gaming.

Figure 8B:
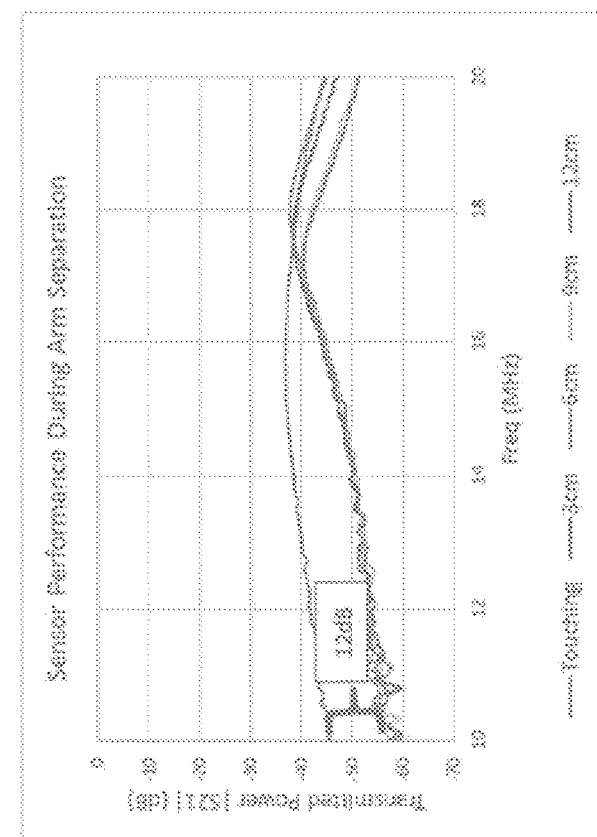
FIG. 8B illustrates experimental results for the experiment illustrated in FIG. 8A.
Figure 8A:
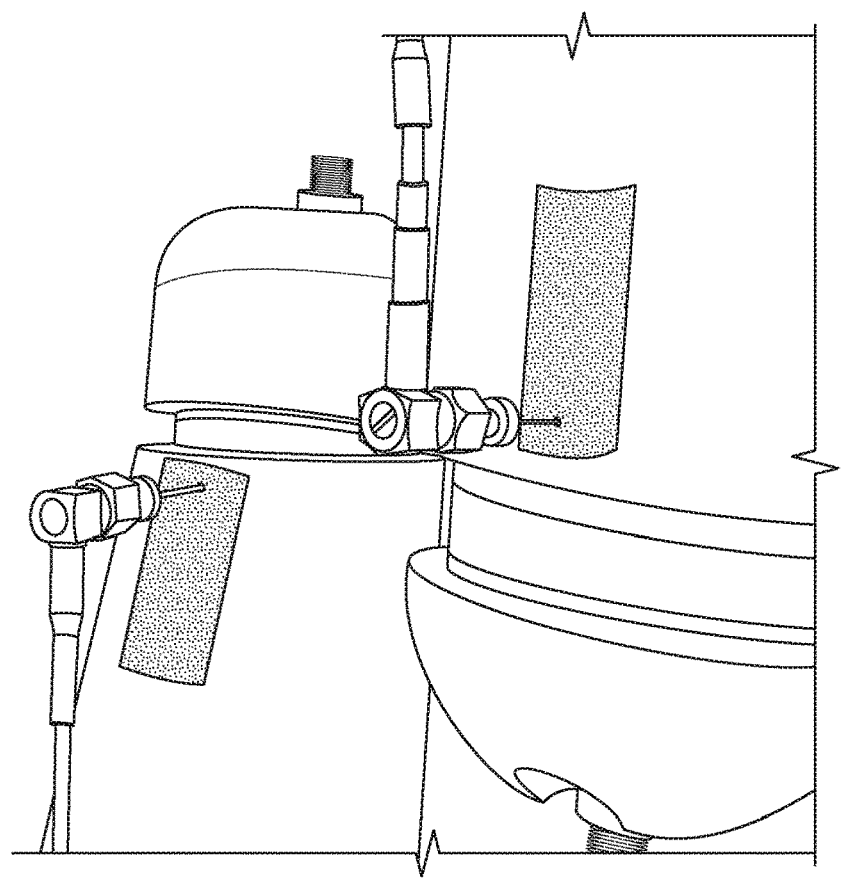
FIG. 8A illustrates an experimental configuration of galvanic sensors, according to implementations of the present disclosure.

With reference to FIG. 8A and FIG. 8B, the study included fabricating and testing skin-to-skin contact sensors optimized for collaborative gaming. FIG. 8A illustrates a prototype of sensors created using cardboard and copper tape being tested on human phantoms. FIG. 8B illustrates a plot of sensor performance over a range of frequencies to illustrate the dynamic range and selection of operation frequency.

Performance of the sensors with different frequency signals was recorded using a network analyzer as shown in FIG. 8B. The phantoms used in the experiment are structures that emulate the electromagnetic properties of human tissue. FIG. 8B illustrates experimental results from the experiment shown in FIG. 8A, including showing a dynamic range of 12 dB between measurements of touching and not touching at 10 MHz. The transceiver electronics use the difference in received power to differentiate between touching and not touching. Measurements with static human phantoms show sensor viability, and the study validated performance of these sensors by dynamically detecting skin-to-skin contact between human subjects in real time for input to collaborative video games. Realtime skin-to-skin contact detection is performed using custom electronics that measure the power transferred between the sensors. The transferred power is then used to determine the touching status of the players and share the result with a gaming device via Bluetooth.

Figure 9B:
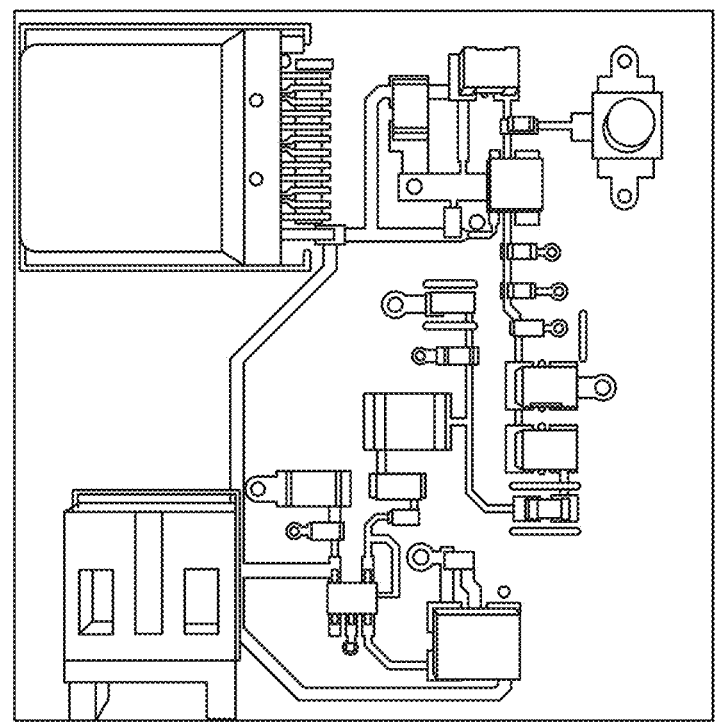
FIG. 9B illustrates an example printed circuit board that can be used as a galvanic coupling transmitter, according to implementations of the present disclosure.
Figure 9A:
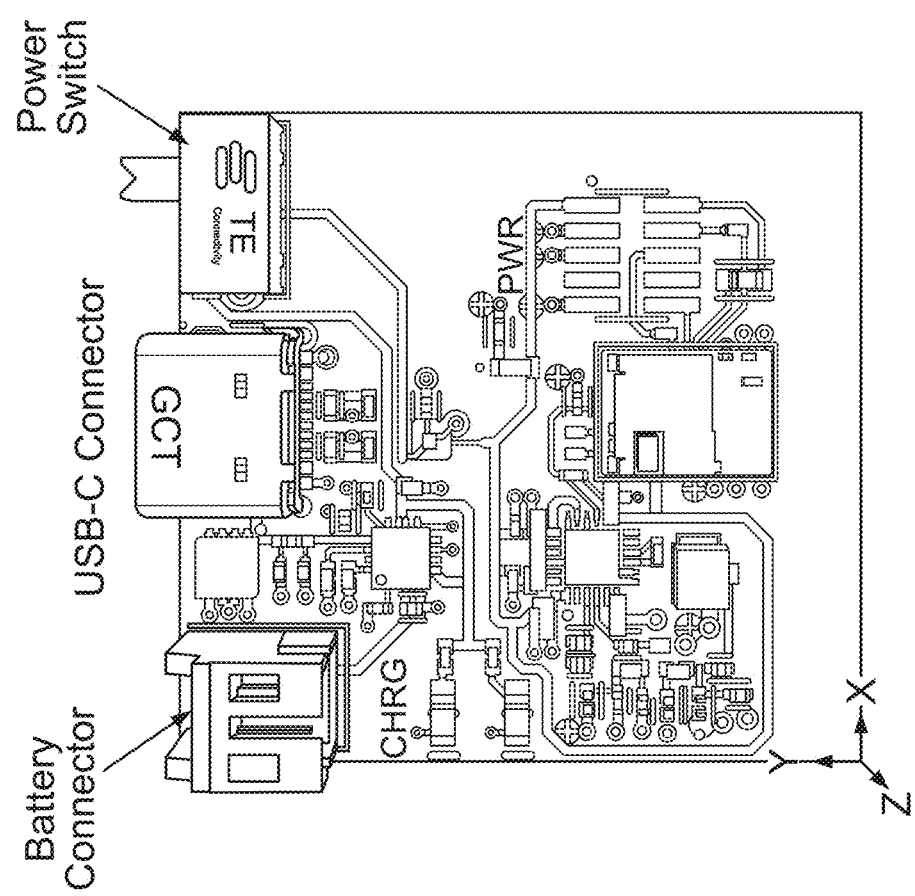
FIG. 9A illustrates an example printed circuit board that can be used as a galvanic coupling receiver, according to implementations of the present disclosure.
Figure 9D:
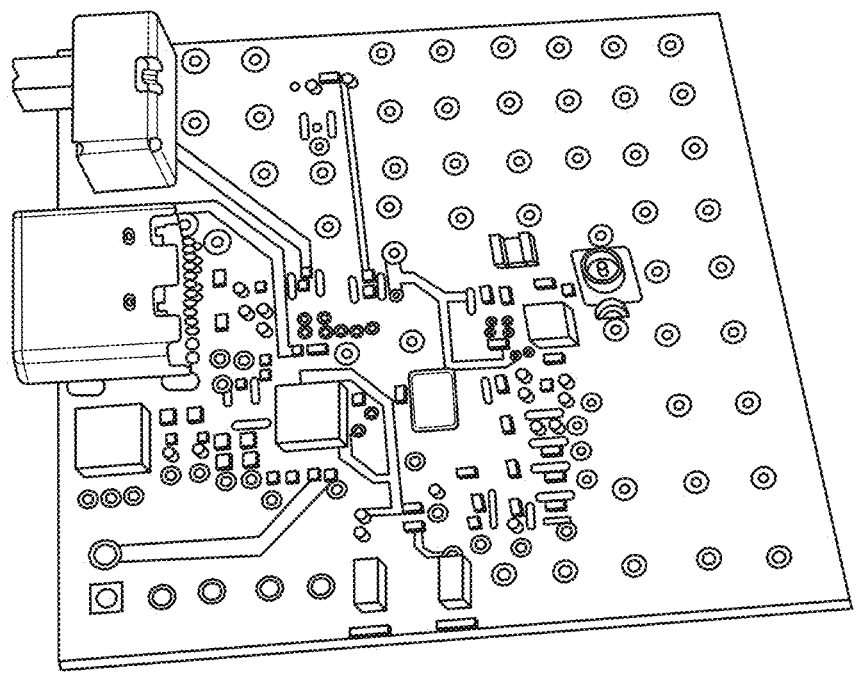
FIG. 9D illustrates an example printed circuit board that can be used as a galvanic coupling transmitter, according to implementations of the present disclosure.
Figure 9C:
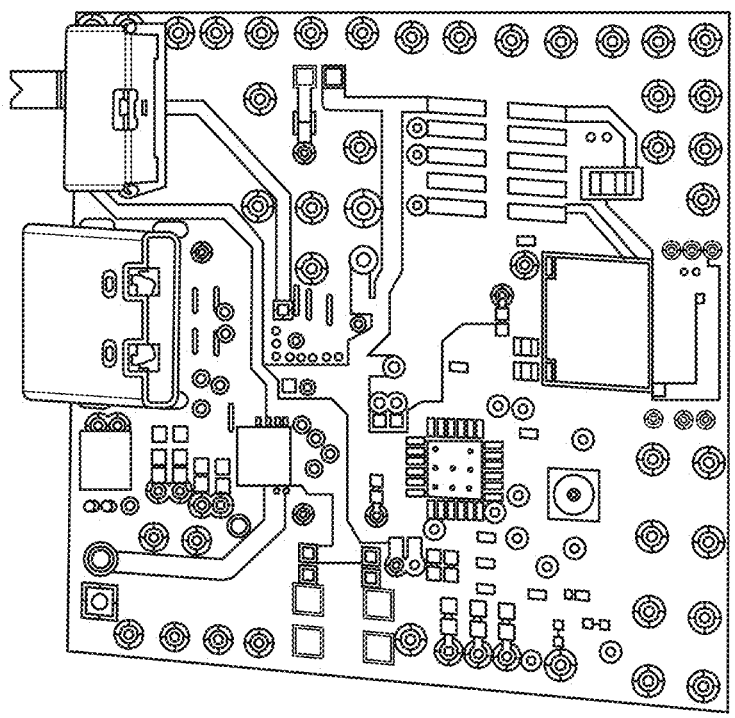
FIG. 9C illustrates an example printed circuit board that can be used as a galvanic coupling receiver, according to implementations of the present disclosure.
Figure 9E:
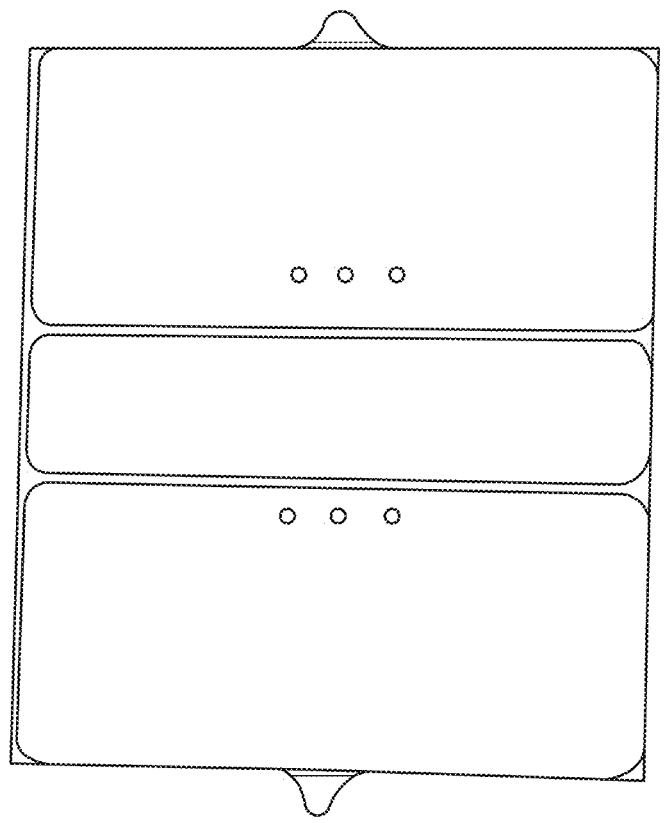
FIG. 9E illustrates an example pair of copper contacts that can be used for conducting electrical signals on a patient's skin, according to implementations of the present disclosure.
Figure 9E:
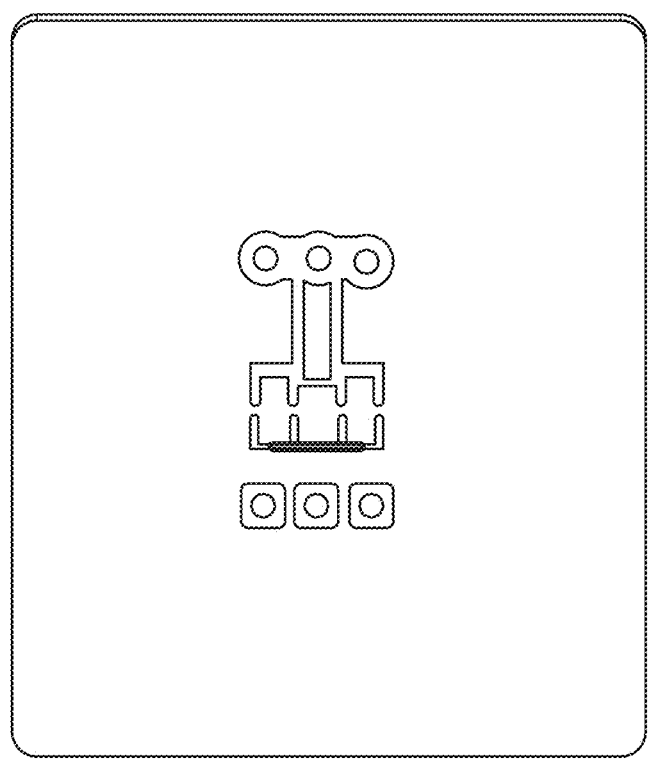

The study further included the design of example transmitter and receiver circuits that can be used in implementations of the present disclosure. FIG. 9A illustrates an example receiver circuit schematic and FIG. 9B illustrates an example transmitter circuit schematic. A transmitter, receiver, and contacts were fabricated as part of the study. FIG. 9C illustrates an example printed circuit board that can be used as a galvanic coupling receiver, and FIG. 9D illustrates an example printed circuit board that can be used as a galvanic coupling transmitter, according to implementations of the present disclosure. FIG. 9E illustrates an example pair of copper contacts that can be used for conducting electrical signals on a patient's skin, according to implementations of the present disclosure.

Figure 10A:
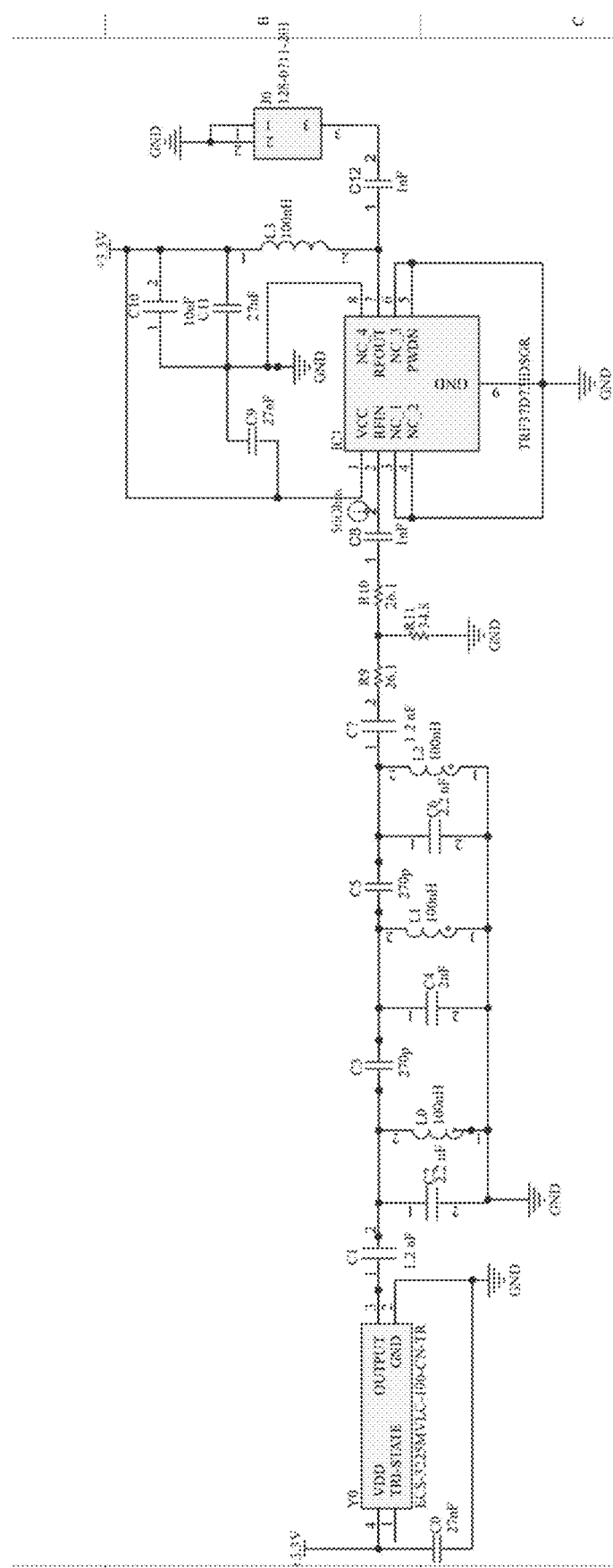
FIG. 10A illustrates an example circuit diagram for a signal transmission circuit, according to implementations of the present disclosure.

FIG. 10A illustrates an example transmission circuit diagram that can be used in transmitters for galvanic sensing, according to implementations of the present disclosure. The signal is generated and put through a Bandpass filter to ensure a desired signal frequency is being produced. As described with reference to FIG. 5, a different frequency can be used for each pair of transmitter/receiver devices to prevent a detection of the user's own body. In the study, two pairs were used, with one pair at 10 MHz and the other at 12 MHz, as shown in FIG. 5. After being filtered, signal power is then boosted (TRF Chip) and then sent to the copper sensor (GND).

Figure 10B:
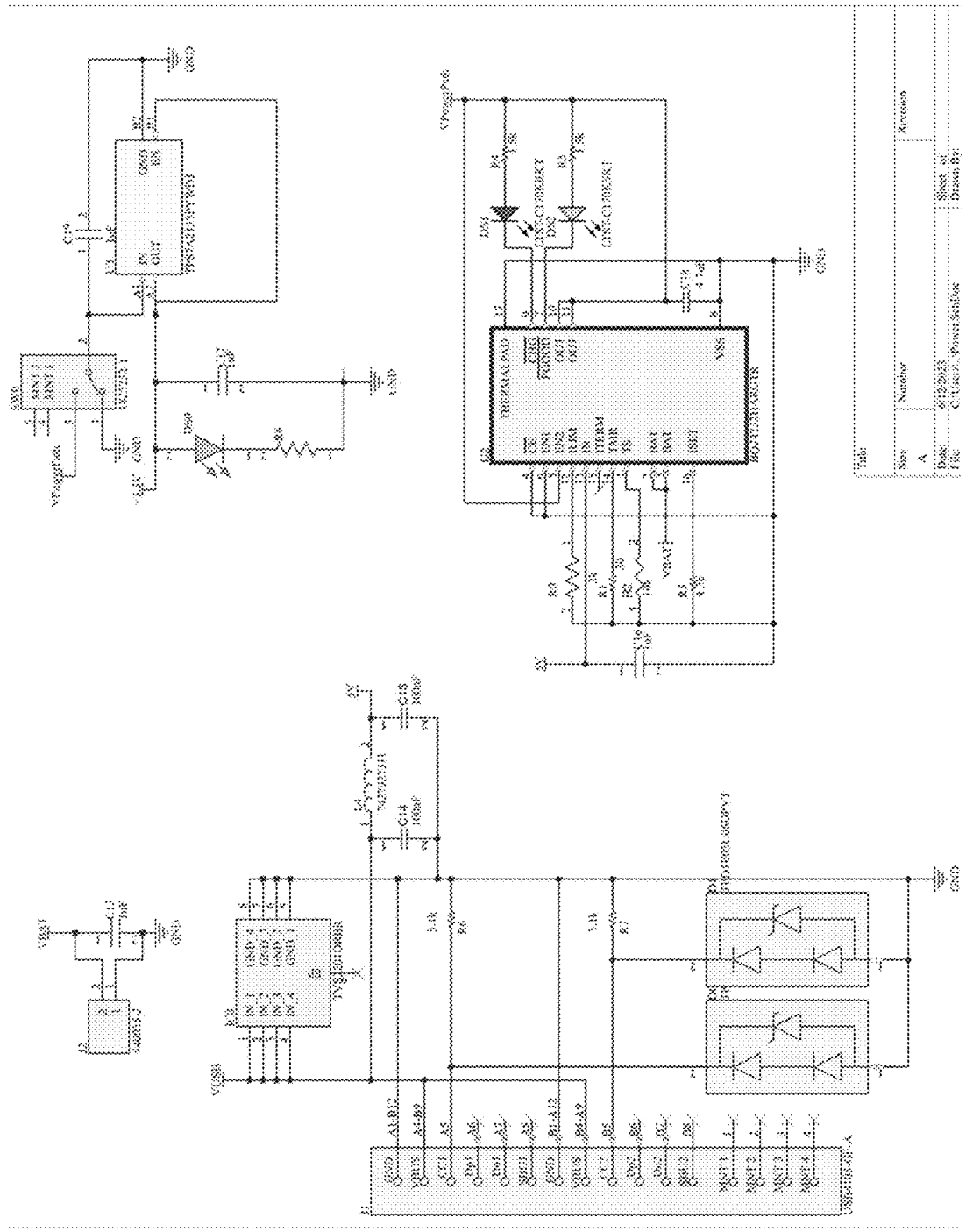
FIG. 10B illustrates an example circuit diagram for a power management circuit, according to implementations of the present disclosure.

FIG. 10B illustrates an example circuit diagram for a power management circuit, according to implementations of the present disclosure. The power management circuit can include voltage regulation for the voltage received by the battery, a connector and circuit for charging the battery. A charging circuit can control the flow of electricity through the entire circuit and decide if power should be flowing into the battery to charge or from the battery to the rest of the circuit. As shown in FIG. 10B, the circuit can further include a switch turn on and off the signal generation and to limit the voltage to be exactly 3.3 volts (the non-limiting example voltage used in the circuit of FIG. 10B).

Figure 10C:
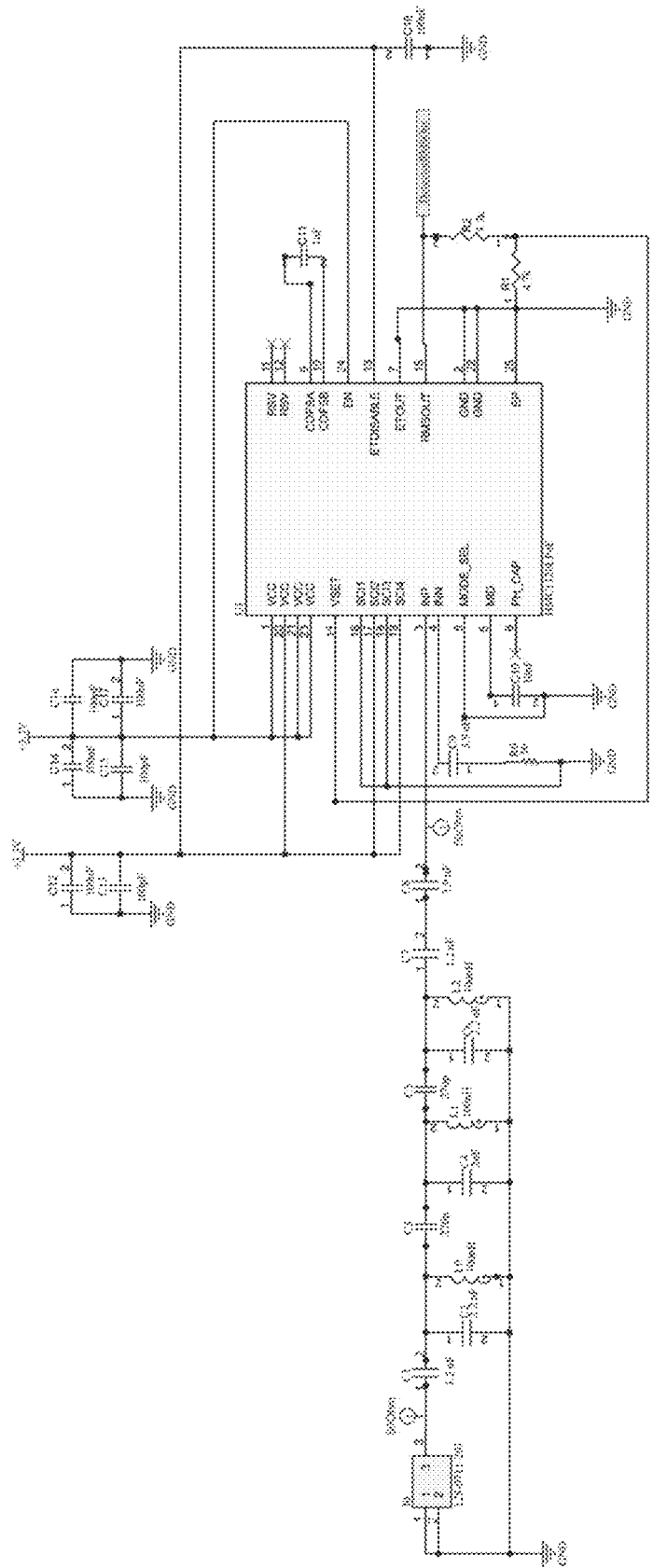
FIG. 10C illustrates an example circuit diagram for a signal receiver circuit, according to implementations of the present disclosure.

FIG. 10C illustrates an example circuit diagram for a signal receiver circuit, according to implementations of the present disclosure. Signals are received from the GND and filtered using a bandpass filter. A microcontroller measures the power level of the signal and provides the measured power level to the Bluetooth chip.

Figure 10D:
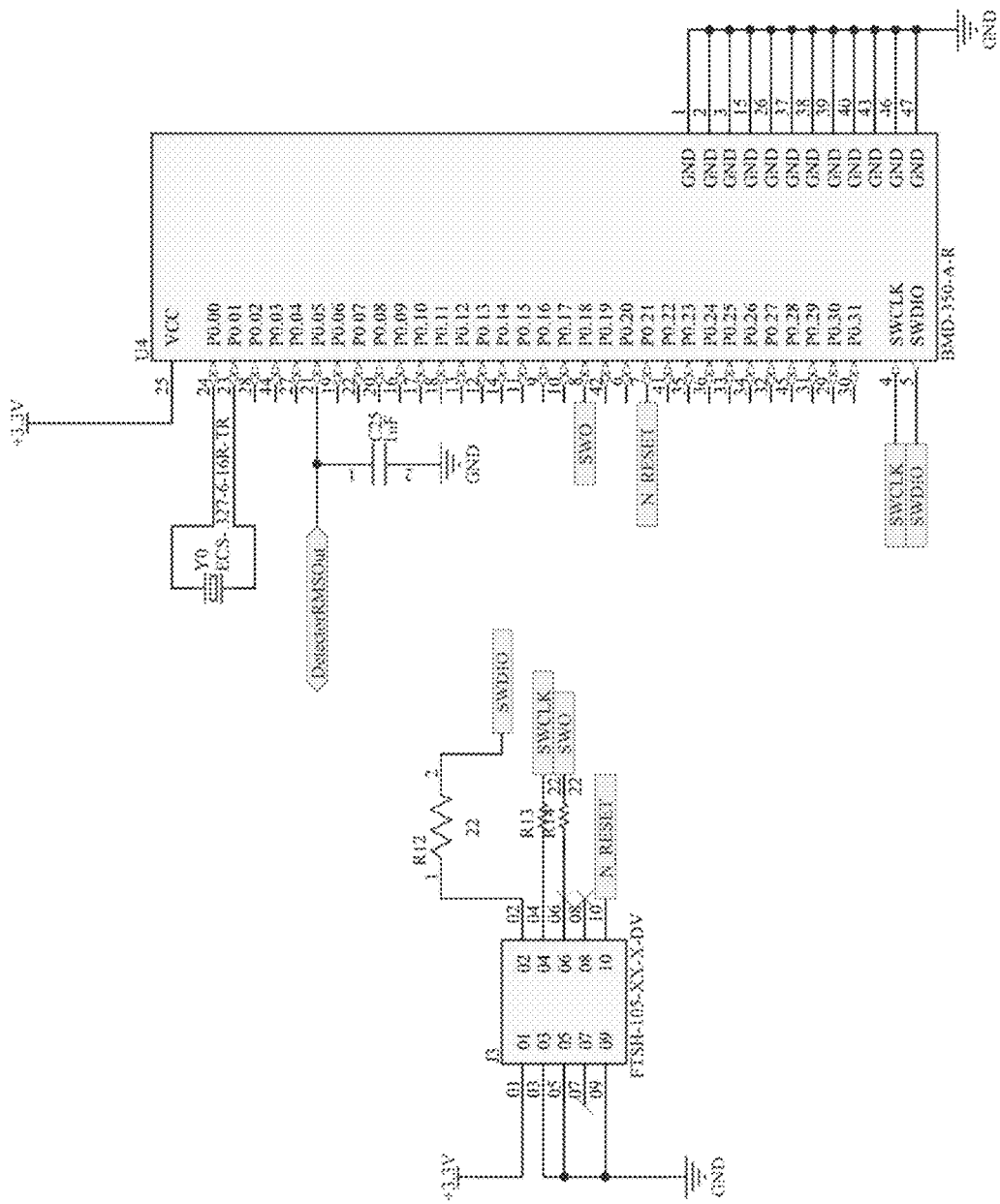
FIG. 10D illustrates an example circuit diagram for a Bluetooth circuit, according to implementations of the present disclosure.

FIG. 10D illustrates an example circuit diagram for a Bluetooth circuit, according to implementations of the present disclosure. The Bluetooth circuit can receive a power level from the signal receiver circuit shown in FIG. 10C and transmit a Bluetooth signal in response to determining that a touch has occurred. It should be understood that the circuit diagrams shown in FIGS. 10A-10D are non-limiting examples of circuits that can be used, and that in various implementations of the present disclosure the receivers, transmitters, transceivers, and computing devices can be implemented using different numbers and configurations of circuits from the circuits illustrated in FIGS. 10A-10D.

Figure 11A:
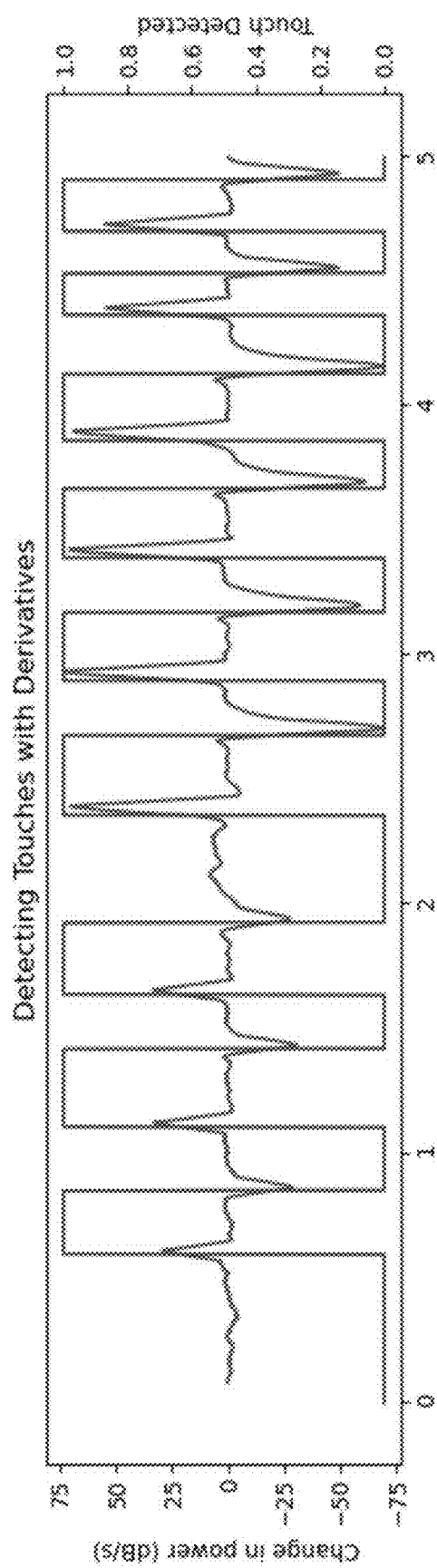
FIG. 11A illustrates an example waveform including detected touches based on derivatives representing the change in power.
Figure 11B:
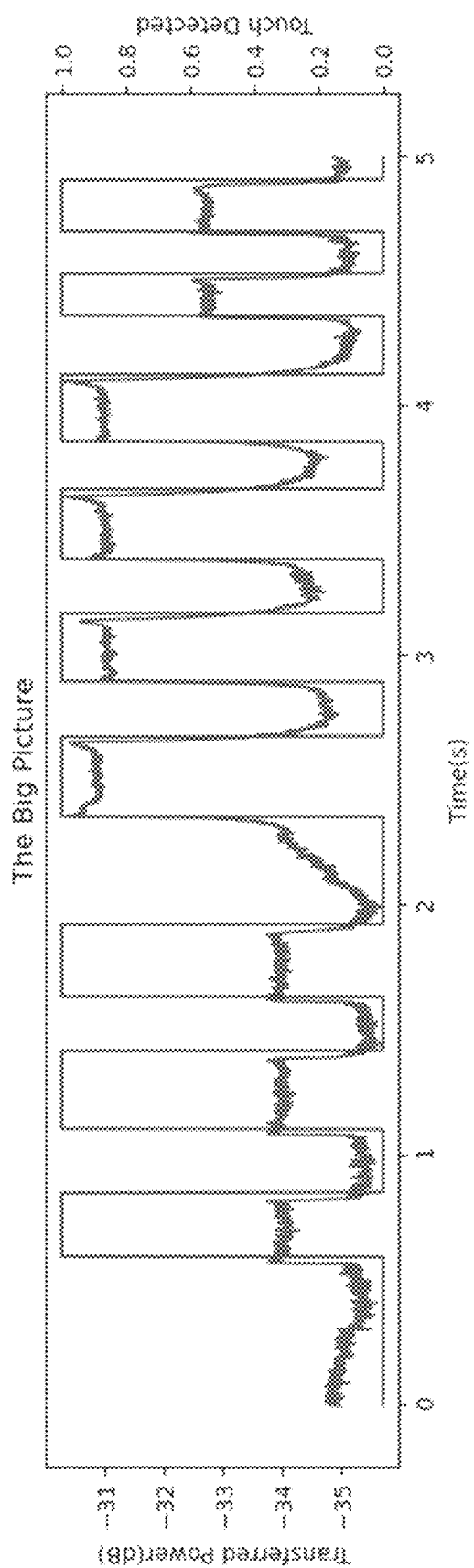
FIG. 11B illustrates an example waveform showing the magnitude of transferred power in dB and detected touches.

FIGS. 11A-11B illustrate methods of determining touch using derivative and magnitude of the sensed signals, which can be used by implementations of the present disclosure (e.g., the Bluetooth circuit shown in FIG. 10D). The study further included experiments using galvanic coupling to detect touch using implementations of the present disclosure. FIG. 11A illustrates detecting touch using derivatives of the power level of the received signal. FIG. 11B illustrates detecting touch using the magnitude of the power level of the received signal. It should be understood that the methods of detecting touch shown in FIG. 11A and FIG. 11B are intended only as non-limiting examples and that different implementations of the present disclosure can detect touch in different ways.

Figure 12A:
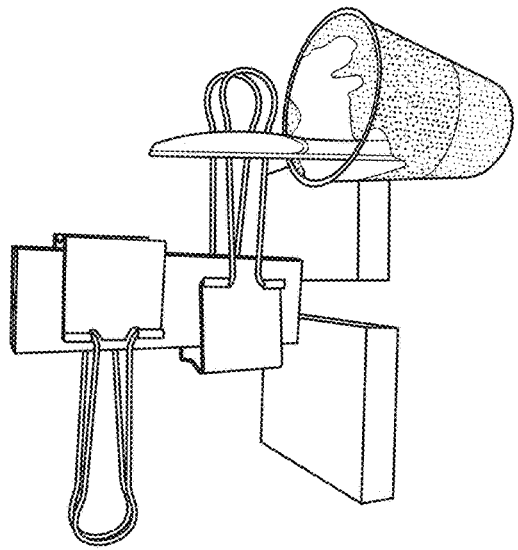
FIG. 12A illustrates an example mold that can be used to form an example wristband, according to implementations of the present disclosure.
Figure 12B:
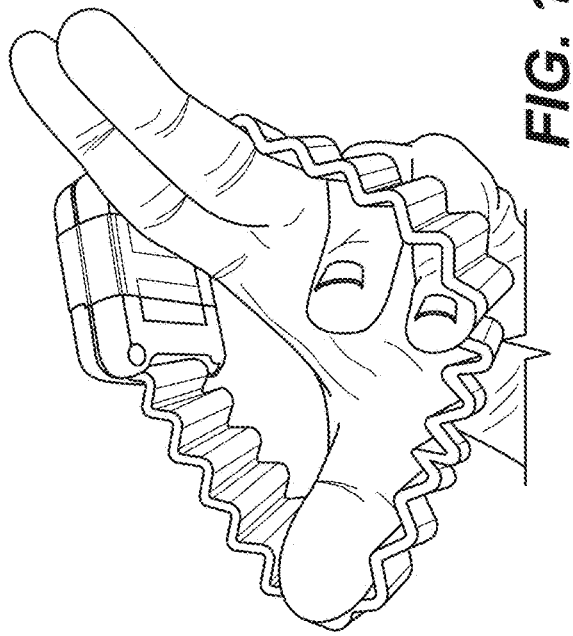
FIG. 12B illustrates the example mold of FIG. 12B in a closed position to form a wristband.
Figure 12C:
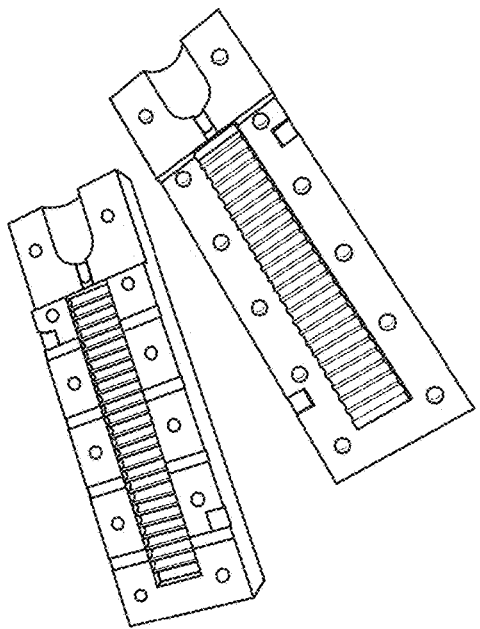
FIG. 12C illustrates an example wristband formed using the mold illustrated in FIG. 12A and FIG. 12B.
Figure 12D:
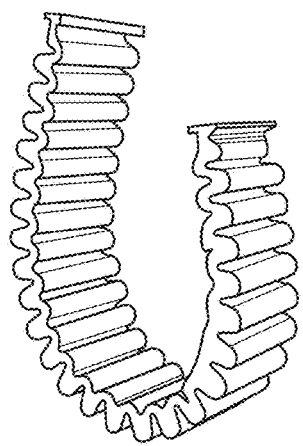
FIG. 12D illustrates elasticity of the example wristband shown in FIG. 12C.

The study included fabricating an example wearable device using flexible silicone and transparent resin. FIG. 12A illustrates an open mold used to form a silicone wristband. FIG. 12B illustrates the mold of FIG. 12A in a closed position. FIG. 12C illustrates a flexible silicone wristband formed using the mold shown in FIG. 12A and FIG. 12B. FIG. 12D illustrates the flexibility of the example silicone wristband.

Figure 13B:
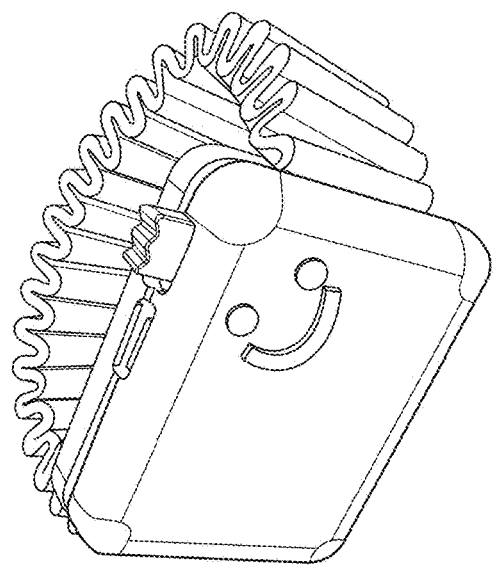
FIG. 13B illustrates a wearable device including the housing shown in FIG. 13A and the wristband shown in FIG. 12C.
Figure 13D:
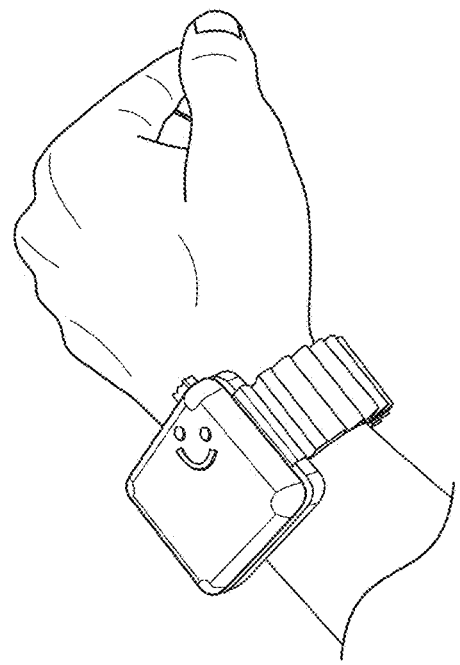
FIG. 13D illustrates the wearable device of FIG. 13B positioned on a wrist.
Figure 13A:
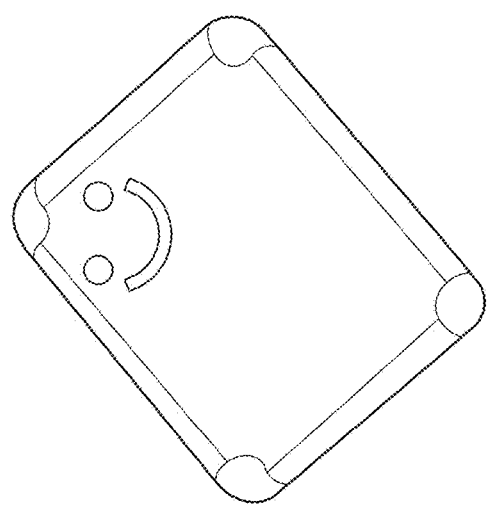
FIG. 13A illustrates an example housing formed from translucent resin, according to implementations of the present disclosure.
Figure 13C:
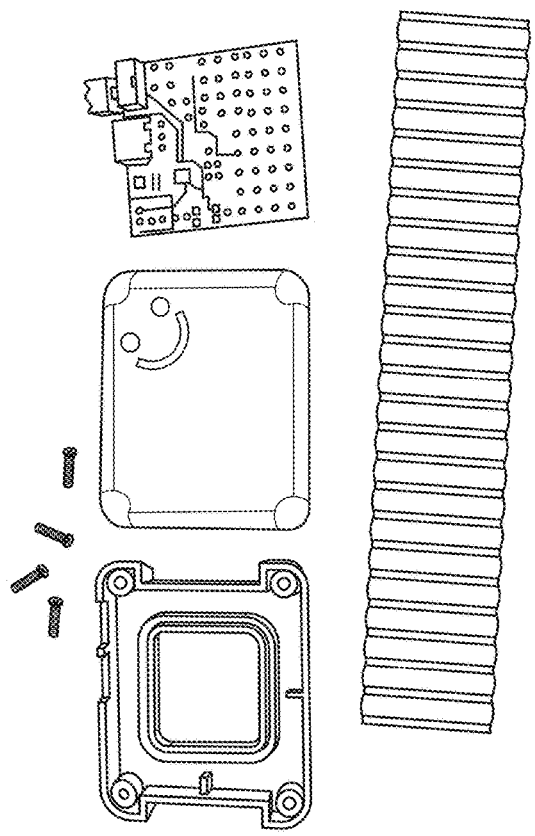
FIG. 13C illustrates an exploded view of the wearable device shown in FIG. 13B.

FIG. 13A illustrates an example housing formed from translucent resin in the study. FIG. 13B illustrates a wearable device including the housing shown in FIG. 13A and the wristband shown in FIG. 12C. FIG. 13C illustrates an exploded view of the wearable device shown in FIG. 13B. FIG. 13D illustrates the wearable device of FIG. 13B positioned on a wrist.

Figure 14:
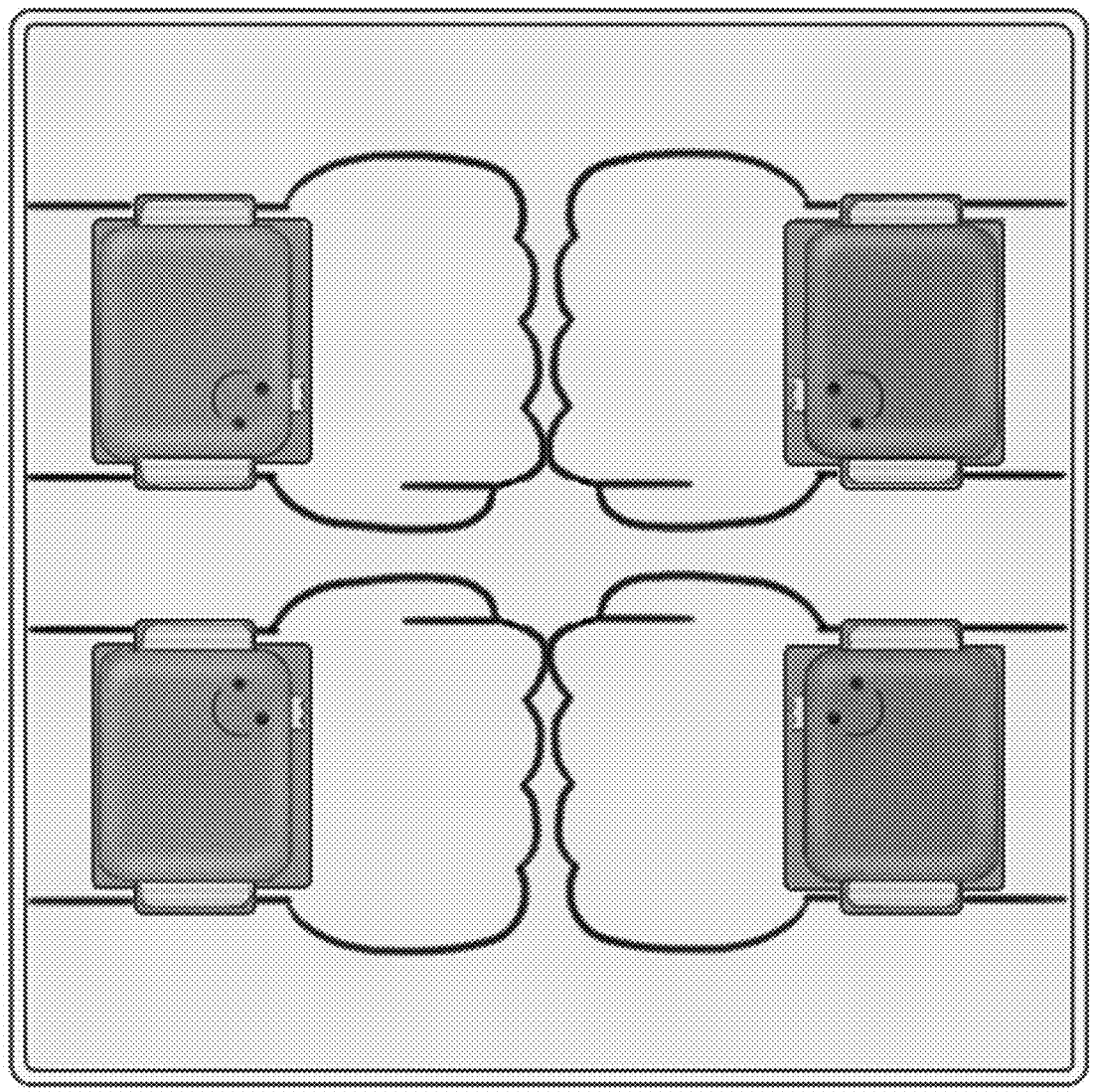
FIG. 14 illustrates an example of two pairs of wearable devices used for contact sensing.
Figure 15:
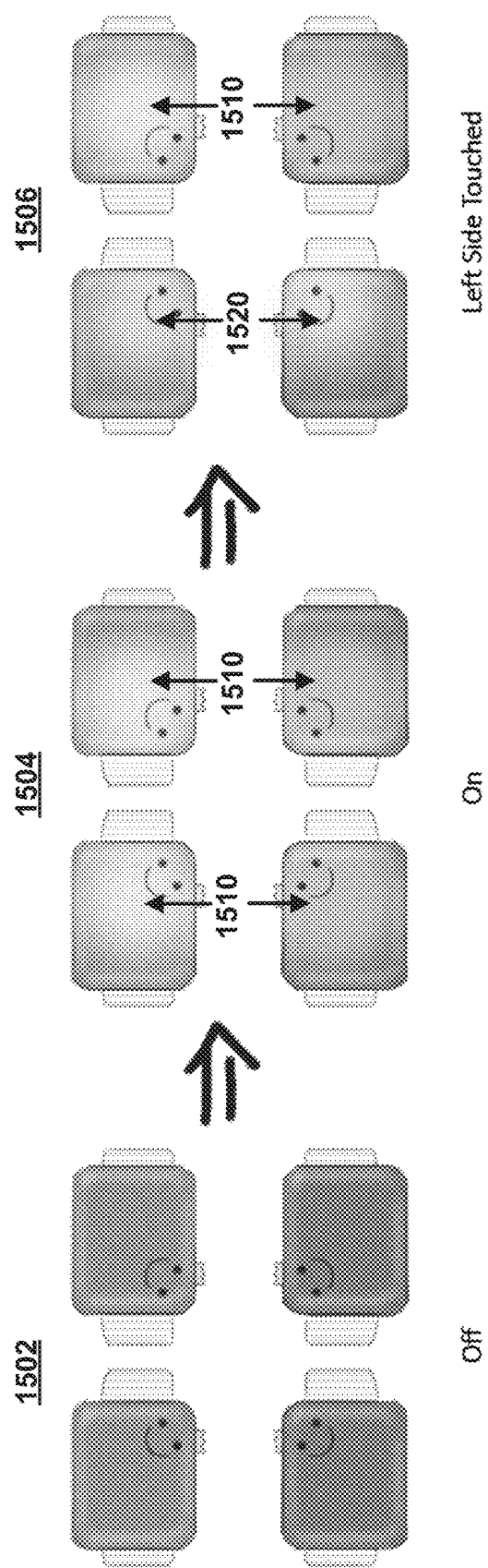
FIG. 15 illustrates an example of visual indicators showing that a touch event has occurred, according to implementations of the present disclosure.

FIG. 14 illustrates an example of two pairs of wearable devices used for contact sensing. The wearable devices described herein (e.g., the two pairs of wearable devices shown in FIG. 14) can optionally include visual indicators of the device status. As shown in FIG. 15, a set of devices is shown in a first state 1502, a second state 1504, and a third state 1506. In the first state 1502, the devices are not illuminated. As a non-limiting example, the first state 1502 is an off state where the devices are not active. In the second state 1504, the devices are illuminated by lights 1510 with a first color. As a non-limiting example, the lights can be LEDs, and the first color can be a white light. In the third state 1506, the illumination can be changed based on a detected touch event. When the wearable devices detect contact (e.g., through the galvanic sensors described herein), a lights 1520 with a different color (e.g., yellow) can be activated to indicate that the touch has occurred.

Example Computing Device

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 2, an example computing device 200 upon which the methods described herein may be implemented is illustrated. It should be understood that the example computing device 200 is only one example of a suitable computing environment upon which the methods described herein may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

REFERENCES

[1] Adiyan Mujibiya, Xiang Cao, Desney S. Tan, Dan Morris, Shwetak N. Patel, and Jun Rekimoto. 2013. The sound of touch: on-body touch and gesture sensing based on transdermal ultrasound propagation. In Proceedings of the 2013 ACM international conference on Interactive tabletops and surfaces (ITS '13). Association for Computing Machinery, New York, NY, USA, 189-198. DOI: https://doi.org/10.1145/2512349.2512821

[2] Chris Harrison, Desney Tan, and Dan Morris. 2011. Skinput: appropriating the skin as an interactive canvas. Commun. ACM 54, 8 (August 2011), 111-118. DOI: https://doi.org/10.1145/1978542.1978564

[3] Srinath Sridhar, Anders Markussen, Antti Oulasvirta, Christian Theobalt, and Sebastian Boring. 2017. WatchSense: On- and Above-Skin Input Sensing through a Wearable Depth Sensor. In Proceedings of the 2017 CHI Conference on Human Factors in Computing Systems (CHI '17). Association for Computing Machinery, New York, NY, USA, 3891-3902. DOI: https://doi.org/10.1145/3025453.3026005

[4] Chris Harrison, Hrvoje Benko, and Andrew D. Wilson. 2011. OmniTouch: wearable multitouch interaction everywhere. In Proceedings of the 24th annual ACM symposium on User interface software and technology (UIST '11). Association for Computing Machinery, New York, NY, USA, 441-450. DOI: https://doi.org/10.1145/2047196.2047255.

[5] Robert Xiao, Teng Cao, Ning Guo, Jun Zhuo, Yang Zhang, and Chris Harrison. 2018. LumiWatch: On-Arm Projected Graphics and Touch Input. Proceedings of the 2018 CHI Conference on Human Factors in Computing Systems. Association for Computing Machinery, New York, NY, USA, Paper 95, 1-11. DOI: https://doi.org/10.1145/3173574.3173669

[6] Gierad Laput, Robert Xiao, Xiang 'Anthony' Chen, Scott E. Hudson, and Chris Harrison. 2014. Skin buttons: cheap, small, low-powered and clickable fixed-icon laser projectors. In Proceedings of the 27th annual ACM symposium on User interface software and technology (UIST '14). Association for Computing Machinery, New York, NY, USA, 389-394. DOI: https://doi.org/10.1145/2642918.2647356

[7] Masa Ogata and Michita Imai. 2015. SkinWatch: skin gesture interaction for smart watch. In Proceedings of the 6th Augmented Human International Conference (AH '15). Association for Computing Machinery, New York, NY, USA, 21-24. DOI: https://doi.org/10.1145/2735711.2735830

[8] Suzuki, Y., Sekimori, K., Shizuki, B., & Takahashi, S. (2019). Touch Sensing on the Forearm Using the Electrical Impedance Method. 2019 IEEE International Conference on Pervasive Computing and Communications Workshops (PerCom Workshops), 255-260

[9] W. J. Tomlinson, S. Banou, C. Yu, M. Stojanovic and K. R. Chowdhury, "Comprehensive Survey of Galvanic Coupling and Alternative Intra-Body Communication Technologies," in *IEEE Communications Surveys & Tutorials*, vol. 21, no. 2, pp. 1145-1164, Secondquarter 2019, doi: 10.1109/COMST.2018.2879643.

[10] Hall, P. S., & Hao, Y. (Eds.). (2012). Antennas and propagation for body-centric wireless communications. ProQuest Ebook Central Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A wearable device comprising:
one or more galvanic coupling sensors, each galvanic coupling sensor comprising a plurality of electrodes configured to interface with a wearer's skin, wherein at least one of the one or more galvanic coupling sensors is a wristband comprising a plurality of sections of conductive yarn and a plurality of sections of nonconductive yarn; and
a microcontroller operably coupled to the one or more galvanic coupling sensors, the microcontroller being configured to detect a collaborative interaction event by measuring power transferred between the one or more galvanic coupling sensors.

2. The wearable device of claim 1, wherein at least one of the one or more galvanic coupling sensors is configured to transmit a high frequency signal through the wearer's skin.

3. The wearable device of claim 1, further comprising a wristband, wherein the one or more galvanic coupling sensors are disposed on the wristband.

4. The wearable device of claim 1, wherein each of the plurality of sections of conductive yarn are separated by sections of nonconductive yarn of the plurality of sections of nonconductive yarn.

5. A system comprising:
a plurality of wearable devices, each wearable device comprising at least two galvanic coupling sensors, each galvanic coupling sensor comprising a plurality of electrodes configured to interface with a wearer's skin, wherein the at least two galvanic coupling sensors comprise a first galvanic coupling sensor and a second galvanic coupling sensor, and wherein the first galvanic coupling sensor is configured to transmit a first signal at a first frequency and the second galvanic coupling sensor is configured to transmit a second signal at a second frequency, and a microcontroller operably coupled to the at least two galvanic coupling sensors, the microcontroller being configured to detect a collaborative interaction event by measuring power transferred between the at least two galvanic coupling sensors; and a remote computing device operably coupled to at least one of the wearable devices, the remote computing device being configured to receive a detection from at least one of the plurality of wearable devices that a collaborative interaction event has occurred.

6. The system of claim 5, wherein at least one of the at least two galvanic coupling sensors is configured to transmit a high frequency signal through the wearer's skin.

7. The system of claim 5, wherein the remote computing device is configured to execute a control command based on the detection from at least one of the plurality of wearable devices that a collaborative interaction event has occurred.

8. The system of claim 7, wherein the control command is configured to facilitate interactive learning or provide therapy.

9. The system of claim 6, wherein at least one of the plurality of wearable devices comprises a wristband, the wristband comprising a conductive yarn.

10. The system of claim 9, wherein the wristband are a plurality of sections of conductive yarn and a plurality of sections of nonconductive yarn.

11. A system comprising:
a first wearable sensor in operable communication with a microcontroller; and
a second wearable sensor, each of the first wearable sensor and the second wearable sensor comprising one or more galvanic coupling sensors, each galvanic coupling sensor comprising a plurality of electrodes configured to interface with a wearer's skin, wherein the one or more galvanic coupling sensors comprise a first galvanic coupling sensor and a second galvanic coupling sensor, and wherein the first galvanic coupling sensor is configured to transmit a first signal at a first frequency and the second galvanic coupling sensor is configured to transmit a second signal at a second frequency;

wherein the microcontroller is configured to:
receive a sensor signal from the first wearable sensor; and
determine, based on the sensor signal, whether a collaborative interaction event occurred between the first wearable sensor and the second wearable sensor.

12. The system of claim 11, wherein the first wearable sensor comprises a wristband, the wristband comprising a conductive yarn.

13. The system of claim 12, wherein the wristband comprises a plurality of sections of conductive yarn and a plurality of sections of nonconductive yarn.

14. The system of claim 13, wherein each of the plurality of sections of conductive yarn are separated by sections of nonconductive yarn of the plurality of sections of nonconductive yarn.

15. The system of claim 11, wherein the microcontroller is operably connected to a display, and configured to output an indication that the collaborative interaction event occurred to the display.

16. The system of claim 11, wherein the collaborative interaction event comprises a skin-to-skin touch between a first user wearing the first wearable sensor and a second user wearing the second wearable sensor.

17. The system of claim 11, wherein at least one of the one or more galvanic coupling sensors are configured to transmit a high frequency signal through the wearer's skin.

* * * * *